(12) United States Patent
Sbriglia et al.

(10) Patent No.: US 10,150,232 B2
(45) Date of Patent: Dec. 11, 2018

(54) PROCESS FOR PRODUCING ARTICLES FORMED FROM POLYLACTIC ACID AND ARTICLES MADE THEREFROM

(71) Applicant: W. L. Gore & Associates, Inc., Newark, DE (US)

(72) Inventors: Guy A. Sbriglia, Christiana, PA (US); Scott A. Gore, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 28 days.

(21) Appl. No.: 15/485,891

(22) Filed: Apr. 12, 2017

(65) Prior Publication Data

US 2017/0218159 A1 Aug. 3, 2017

Related U.S. Application Data

(62) Division of application No. 14/811,054, filed on Jul. 28, 2015, now Pat. No. 9,732,184.

(Continued)

(51) Int. Cl.

| | |
|---|---|
| *B29C 43/00* | (2006.01) |
| *C08J 9/28* | (2006.01) |
| *C08G 63/08* | (2006.01) |
| *B29C 55/00* | (2006.01) |
| *B29C 44/34* | (2006.01) |
| *B29C 43/24* | (2006.01) |
| *B29C 43/52* | (2006.01) |
| *B29C 55/04* | (2006.01) |
| *C08J 9/24* | (2006.01) |
| *B29C 44/30* | (2006.01) |
| *C08J 9/00* | (2006.01) |
| *B29K 33/04* | (2006.01) |
| *B29K 105/04* | (2006.01) |
| *B29C 47/00* | (2006.01) |
| *B29K 67/00* | (2006.01) |
| *B29C 55/02* | (2006.01) |
| *B29K 105/00* | (2006.01) |

(Continued)

(52) U.S. Cl.
CPC ............ *B29C 43/003* (2013.01); *B29C 43/24* (2013.01); *B29C 43/52* (2013.01); *B29C 44/30* (2013.01); *B29C 44/348* (2013.01); *B29C 55/005* (2013.01); *B29C 55/04* (2013.01); *C08G 63/08* (2013.01); *C08J 9/0014* (2013.01); *C08J 9/0066* (2013.01); *C08J 9/24* (2013.01); *C08J 9/28* (2013.01); *B29C 47/0004* (2013.01); *B29C 55/02* (2013.01); *B29K 2033/04* (2013.01); *B29K 2067/046* (2013.01); *B29K 2105/04* (2013.01); *B29K 2105/041* (2013.01); *B29K 2105/251* (2013.01); *B29K 2995/006* (2013.01); *B29K 2995/0077* (2013.01); *C08G 2101/00* (2013.01); *C08J 9/365* (2013.01); *C08J 2201/03* (2013.01); *C08J 2205/052* (2013.01); *C08J 2367/04* (2013.01); *C08J 2467/04* (2013.01)

(58) Field of Classification Search
CPC ....... B29C 43/003; B29C 43/24; B29C 43/52; B29C 44/30; B29C 44/348; B29C 55/005; B29C 55/04; B29C 47/0004; B29C 55/02; C08G 63/08; C08G 2101/00; C08J 9/0014; C08J 9/0066; C08J 9/24; C08J 9/28; C08J 2201/03; C08J 2205/052; C08J 2367/04; C08J 2467/04; C08J 9/365; B29K 2033/04; B29K 2067/046; B29K 2105/04; B29K 2105/041; B29K 2105/251; B29K 2995/006; B29K 2995/0077

See application file for complete search history.

(56) References Cited

U.S. PATENT DOCUMENTS

| | | |
|---|---|---|
| 3,953,566 A | 4/1976 | Gore |
| 4,482,516 A | 11/1984 | Bowman et al. |

(Continued)

FOREIGN PATENT DOCUMENTS

| | | | |
|---|---|---|---|
| EP | 0368571 A2 * | 5/1990 | ............ A61K 9/204 |
| EP | 0321176 | 2/1995 | |

(Continued)

OTHER PUBLICATIONS

ASTM International, Standard Practice for Dilute Solution Viscosity of Polymers, Designation: D2857-95 (Reapproved 2007), 6 pages, 2014.

(Continued)

*Primary Examiner* — Irina S Zemel
(74) *Attorney, Agent, or Firm* — Amy L. Miller

(57) ABSTRACT

PLA polymers that can be expanded into microporous articles having a node and fibril microstructure are provided. The fibrils contain PLA polymer chains oriented with the fibril axis. Additionally, the PLA polymers have an inherent viscosity greater than about 3.8 dL/g and a calculated molecular weight greater than about 150,000 g/mol. The PLA polymer article may be formed by bulk polymerization where the PLA bulk polymer is made into a preform that is subsequently expanded at temperatures above the glass transition temperature and below the melting point of the PLA polymer. In an alternate embodiment, a PLA polymer powder is lubricated, the lubricated polymer is subjected to pressure and compression to form a preform, and the preform is expanded to form a microporous article. Both the preform and the microporous article are formed at temperatures above the glass transition temperature and below the melting point of the PLA polymer.

34 Claims, 29 Drawing Sheets

Related U.S. Application Data

(60) Provisional application No. 62/030,408, filed on Jul. 29, 2014.

(51) Int. Cl.
  *C08G 101/00* (2006.01)
  *C08J 9/36* (2006.01)

(56) References Cited

U.S. PATENT DOCUMENTS

| | | |
|---|---|---|
| 5,227,412 A | 7/1993 | Hyon et al. |
| 5,443,780 A | 8/1995 | Matsumoto et al. |
| 6,645,618 B2 | 11/2003 | Hobbs et al. |
| 6,780,361 B1 | 8/2004 | Sridharan et al. |
| 7,993,745 B2 | 8/2011 | Narita et al. |
| 2002/0192449 A1 | 12/2002 | Hobbs et al. |
| 2010/0248324 A1 | 9/2010 | Xu et al. |
| 2010/0258977 A1 | 10/2010 | Sakurai et al. |
| 2013/0035449 A1 | 2/2013 | Jung et al. |

FOREIGN PATENT DOCUMENTS

| | | |
|---|---|---|
| EP | 2220150 | 8/2010 |
| EP | 2607415 | 8/2010 |
| WO | WO94/11173 | 5/1994 |

OTHER PUBLICATIONS

Billmeyer, Methods for Estimating Intrinsic Viscosity, Journal of Polymer Science, vol. IV, pp. 83-86, 1949.

Grijpma et al., Chain entanglement, mechanical properties and drawability of poly(lactide), Colloid & Polymer Science, 272:1068-1081, 1994.

Kokturk, G. Serhatkulu, T.F., Cakmak, M., Piskin, E., Evolution of Phase Behavior and Orientation in Uniaxially Deformed Polylactic Acid Films, Polymer Engineering and Science, Aug. 2002, vol. 42, No. 8, 1619-1628.

Mulligan, Jake, Cakmak, Miko, nonlinear Mechanoopitcal Behavior of Uniaxially Stretched Poly(lactic acid): Bynamic Phase Behavior, Macromolecules 2005, 38, 2333-2344.

Ou, X., Cakmak, M., Influence of biaxial stretching mode on the crystalline texture in polylactic acid films, Polymer 49 (2008) 5344-5352.

Zhou, H., Electrospun Fibers From Both Solution and Melt: Processing, Structure and Property, A Dissertation Presented to the Faculty of the Graduate School of Cornell University in Partial Fulfillment of the Requirements for the Degree of Doctor of Philosophy, Jan. 2007, 178 pages.

Hoogsteen , et al., "Crystal Structure, Conformation, and Morphology of Solution-Spun Poly (L-lactide) Fibers", Macromolecules 1990, 23 ,pp. 634-642.

Pan et al, "Polymorphous Crystallization and Multiple Melting Behavior of Poly(L-lactide): Molecular Weight Dependence", Macromolecules 2007, pp. 6898-6905.

Pyda, et al., "Heat capacity of poly(lactic acid)" J. Chem. Thermodynamics 36 (2004) pp. 731-742.

Takahashi, et al., "Crystal transformation from the $\alpha$- to the $\beta$—from upon tensile drawing of poly(L-lactic acid)" Polymer 45 (2004) pp. 4969-4976.

\* cited by examiner

PROCESS FOR PRODUCING ARTICLES FORMED FROM POLYLACTIC ACID AND ARTICLES MADE THEREFROM

FIELD

The present invention relates generally to polylactic acid (PLA), and more specifically to articles formed from polylactic acid that are biodegradable, possess a high modulus of elasticity, and increased tensile strength. Processes for forming both dense and porous articles from polylactic acid are also provided.

BACKGROUND

Polylactic acids (PLA) are aliphatic polyesters and are considered useful biodegradable materials because of their hydrolytic property. Additionally, the degradative product of polylactic acid (i.e., lactic acid) is readily absorbed in vivo. As such, PLA is commonly used for medical purposes, such as in surgical sutures, in sustained-release capsules in drug delivery systems, and as reinforcing materials for bone fractures. However, conventional processes for forming PLA articles possess undesirable features or attributes, such as, for example, processing above the melt temperature of the PLA polymer that degrades the PLA polymers and undesirably colors the polymer, and reduces physical properties such as tensile strength and matrix modulus. Additionally, conventional process are forced to use low molecular weight PLA due to the high melt viscosity.

Thus, there exists a need in the art for a process for making a PLA polymer and a PLA polymer article that is biodegradable, possesses a high modulus of elasticity, and has increased tensile strength.

SUMMARY

One embodiment relates to an article that includes an expanded PLA polymer having a beta crystal phase and nodes and fibrils. The fibrils include polymer chains oriented along a fibril axis. In at least one embodiment, the PLA polymer includes at least one comonomer. Additionally, the PLA polymer has a first melt enthalpy greater than about 30 J/g, an inherent viscosity greater than about 3.8 dL/g and a calculated molecular weight greater than about 190,000 g/mol. The PLA polymer article may have a matrix tensile strength greater than or equal to 110 MPa, or 115 MPa, and a matrix modulus greater than or equal to 3000 MPa. A filler material and/or a coating material may be placed on and/or in the PLA article. In one or more embodiment, the PLA article is microporous. The article may be densified to form a dense article having a porosity less than about 10%.

A second embodiment relates to a process for forming a porous article that includes expanding a PLA polymer preform at a temperature above the glass transition temperature of the PLA polymer and below a melting temperature of the PLA polymer to create a porous PLA article having nodes and fibrils. The preform may be in the form of film, rods, tubes, or discs. In at least one embodiment, the expansion of the preform occurs at a temperature from about 60° C. to about 185° C. A filler material and/or a coating material may be placed on and/or in the PLA article. In one or more embodiment, the porous PLA article is microporous. Additionally, the porous article may be compressed at a temperature below the melting temperature of the PLA polymer to form a dense PLA article that has a porosity less than about 10%.

A third embodiment relates to a process for forming a microporous article that includes (1) lubricating a PLA polymer powder to form a lubricated PLA polymer, (2) subjecting the lubricated PLA polymer to pressure and to a temperature above the glass transition temperature of the PLA polymer and below a melting temperature of the PLA polymer to form a preform, and (3) expanding the preform at a temperature below the melt temperature of the PLA polymer to form a porous article having a structure of nodes and fibrils. The porous article may be a microporous article. In at least one embodiment, the lubricated PLA polymer may be calendered or ram extruded below the melt temperature of the PLA polymer. In one or more embodiment, the PLA polymer is expanded at a temperature that is about 80° C. or less below the melt temperature. The lubricant may be removed from the preform prior to expanding the preform. In a further embodiment, the porous article may be compressed to form a dense article having a porosity of less than about 10%.

A fourth embodiment relates to a process for forming a porous article that includes (1) lubricating a PLA polymer powder to form a lubricated PLA polymer and (2) calendering the lubricated PLA polymer at a temperature above the glass transition temperature of said PLA polymer and below a melting temperature of the PLA polymer to form a porous article having a structure of nodes and fibrils. In at least one embodiment, the calendering occurs at a temperature from about 60° C. to about 185° C. In a further embodiment, the lubricant is removed from the porous article to form a non-lubricated article and the non-lubricated article is calendered to form a dense article having a porosity less than about 10%.

A fifth embodiment relates to a process for forming a dense article that includes applying pressure and heat (e.g. calendering) to a PLA polymer powder having an inherent viscosity greater than about 3.8 dL/g and a molecular weight greater than about 190,000 g/mol at a temperature below the melt temperature of the PLA polymer to form a dense article (e.g., a calendered PLLA film). The dense article may be drawn in one or more direction at a temperature below the melt temperature of the PLA polymer to form a second dense article (e.g., fibrillated (dense) article). The fibrillated (dense) article has a structure of nodes and fibrils and a beta crystal phase. The dense article has a porosity less than about 10%.

A sixth embodiment relates to a dense article that includes a PLA film having a porosity of less than 10%.

A seventh embodiment relates to an article that includes (1) an expanded PLA polymer comprising a beta crystal phase and having nodes and fibrils and (2) at least one filler material. The filler material may include inorganic materials (e.g., silica) carbon black, aerogels, metals, semi-metals, ceramics, carbon/metal particulate blends, activated carbon, hydrogel materials, bioactive substances, stiffening agents, and combinations thereof.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

GLOSSARY

Figure 1:
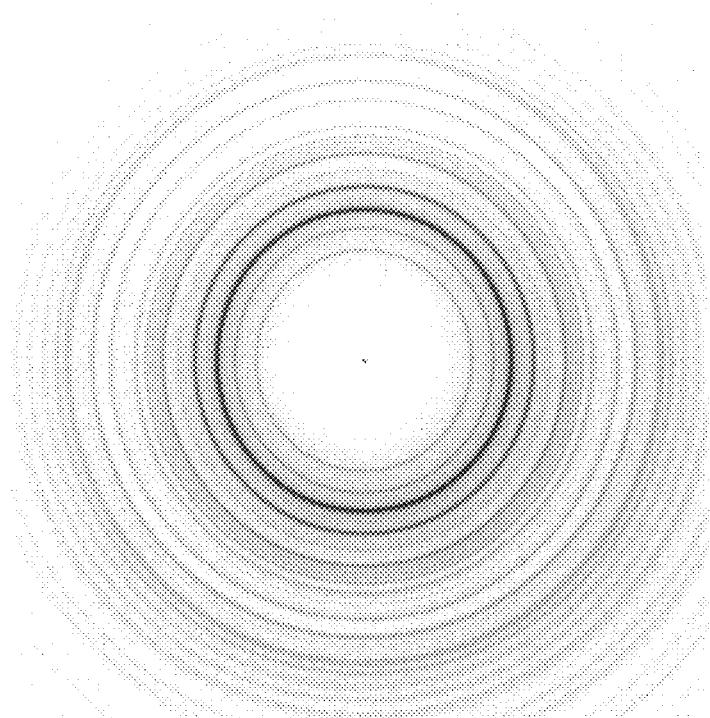
FIG. 1 is a wide angle X-ray diffraction (WAXD) pattern of the PLLA polymer of Example 2 according to at least one embodiment.

As used herein, the term "lubricant" is meant to describe a processing aid that includes, and in some embodiments, consists of, an incompressible fluid that is not a solvent for the polymer at processing conditions. The fluid-polymer surface interactions are such that it is possible to create a homogenous mixture.

As used herein, the term "PLA" refers to polylactic acid and polylactide.

As used herein, the term "PLLA" refers to poly L-lactic acid and poly L-lactide.

As used herein, the term "PDLA" refers to poly D-lactic acid and poly D-lactide.

As used herein, the term "cohesive" is meant to describe a tape or precursor material that is sufficiently strong for further processing.

As used herein, the term "uniaxial" is meant to describe a polymer, membrane, preform, or article that is expanded in only one direction.

As used herein, the term "biaxial" is meant to describe a polymer, membrane, preform, or article that is expanded in at least two directions.

As used herein, the term "microporous" is meant to define an article, such as a membrane, that has pores that are not visible to the naked eye.

As used herein, the terms "melting point", "melt temperature", and "melting temperature" are used interchangeably herein and are meant to define the peak of the melt endotherm as measured by differential scanning calorimetry (DSC) during the first heating of the PLA polymer.

As used herein, the term "fibril axis" is meant to describe the long dimension of the fibril.

As used herein, the terms "dense" and "densified" are meant to describe a PLA polymer article that has a porosity less than about 10%.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the figures should not be construed as limiting.

The present disclosure relates to polylactic acid (PLA) polymers and porous articles made therefrom that are bioabsorbable, biodegradable, and possess a high modulus of elasticity and increased tensile strength. The crystallinity of the PLA polymer may be measured by differential scanning calorimetry (DSC). The melt enthalpy of the PLA polymer as measured by DSC is 30 J/g or greater, and in some embodiments, 40 J/g or greater. The PLA polymers can be formed into microporous articles at temperatures below the melting point of the PLA polymer. The PLA polymer articles have a node and fibril microstructure. In at least one embodiment, the fibrils contain PLA polymer chains oriented with the fibril axis. With reference to the PLA polymers and PLA articles described herein, a node may be described as a larger volume of polymer, and is where a fibril originates or terminates with no clear continuation of the same fibril through the node. A fibril may have a width of less than about 250 nm, or less than about 150 nm.

In forming the PLA polymers, lactides that are primarily either D-lactide or L-lactide are employed. In one or more embodiment, the lactide utilized in the polymerization process is a high purity L-lactide. It is to be appreciated that even though the lactide is principally either D-lactide or L-lactide, small amounts of the opposite isomer, as well as small amounts of comonomers such as cyclic esters and carbonates, may be incorporated into the polymer chain so long as the resultant polymer possesses the inherent viscosities and melt enthalpies described herein. Suitable comonomers include, but are not limited to glycolide, trimethylene carbonate, valerolacone, epsilon-caprolactone 1,5-dioxepan-2-one, and 3,6-di-(n-butyl)-1,4-dioxane-2,5-dione. The optional comonomer(s) may be present in the PLA polymers in an amount from about 0.001 mol % to about 10 mol %, from about 0.01 mol % to about 7 mol %, or from about 0.1 mol % to about 5 mol %.

The conversion of lactide to PLA is initiated by the ring opening polymerization of the lactide. The ring opening may be catalytically mediated by a metal compound, which may or may not also function as an initiator. Additionally, an alcohol may also be added which, along with the metal compound, forms a metal alkoxide in situ. Non-limiting examples of suitable metal compounds include, but are not limited to, stannous 2-ethylhexoanate, Zn(II) oxide, and Zn(II) 2-ethylhexoanate. In at least one embodiment, stannous 2-ethylhexoanate by itself or in combination with an alcohol, may be used as a catalyst. However, it is to be appreciated that any catalyst which is able to effect the ring opening polymerization of lactide at temperatures of 150° C. or lower is suitable for use.

The catalyst may be added in amounts ranging from about 1,500 mol lactide/1 mole catalyst to about 200,000 mol lactide/1 mol catalyst, from about 3000 mol lactide/1 mol catalyst to about 100,000 mol lactide/1 mol catalyst, or from about 7000 mol lactide/1 mol catalyst to about 70,000 mol lactide/1 mol catalyst. In one or more embodiment, about 35,000 mol lactide/1 mole catalyst is added. Alcohol addition levels range from zero to about 1,500 mol lactide/1 mole alcohol, from about 200,000 mol lactide/1 mol alcohol to about 3,000 mol lactide/1 mol alcohol, or from about 70,000 mol lactide/1 mol alcohol to about 7,000 mol lactide/1 mol alcohol. In at least one embodiment, 35,000 mol lactide/1 mol alcohol may be added.

The polymerization reaction occurs at a temperature less than about 150° C., less than about 140° C., or less than about 110° C. The reaction may be stopped at about 90 to 99 percent conversion of lactide to PLA, or at about 95 to 99 percent conversion. The resultant PLA polymer is a solid mass, and may be in the form of a billet if the polymerization occurs in an appropriately sized and shaped container. If desired, the residual lactide may be removed from the PLA polymer by extraction using acetone.

Solution viscosity correlates with polymer chain length, and is commonly used to monitor polymerization reactions and to characterize the final polymer. As such, the molecular weight of the PLA polymers formed from the process described above may be calculated from the solution viscosity. The PLA polymers may have an inherent viscosity greater than about 3.8 dL/g, greater than about 4.5 dL/g, greater than about 5.0 dL/g, greater than about 6.0 dL/g, or greater than about 7.0 dL/g. The PLA polymers have a calculated molecular weight (Mw) greater than about 190,000 g/mol, greater than about 250,000 g/mol, greater than about 290,000 g/mol, greater than about 380,000 g/mol, or greater than about 490,000 g/mol.

Bulk Polymerization Article Formation

The PLA polymer article formed from the bulk polymerization of PLA polymers may be cut, sawn, skived, milled, or otherwise partitioned or divided into a PLA polymer preform that may be subsequently expanded into a microporous article. It is to be appreciated that residual monomer (unreacted monomers) may be removed (e.g., with acetone) before and/or after expansion. Preform shapes include sheets, films, rods, tubes, discs, and the like. To form a microporous article, the PLA polymer preform may be first heated to a temperature below the melting point of the PLA polymer. In one or more embodiment, the preform is heated to a temperature of about 170° C. The PLA polymer preform may then be expanded, which causes the crystalline PLA polymer to reorient and form beta phase crystals while simultaneously forming a highly-fibrillated microporous structure. The presence of beta phase crystals may be determined through wide angle X-ray diffraction (WAXD). The PLA polymer preform may be expanded at temperatures from at least about 1° above the glass transition temperature of the PLA polymer to at least about 1° C. below the melt temperature of the PLA polymer, or from about 60° C. to about 185° C.

Figure 2:
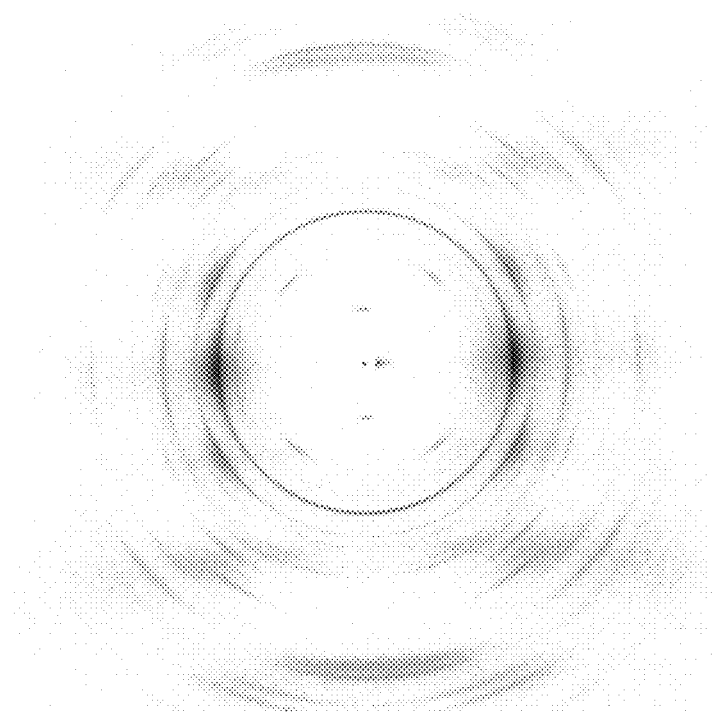
FIG. 2 is a wide angle X-ray diffraction (WAXD) pattern of the PLLA polymer of Example 3 in accordance with at least one embodiment.
Figure 3:
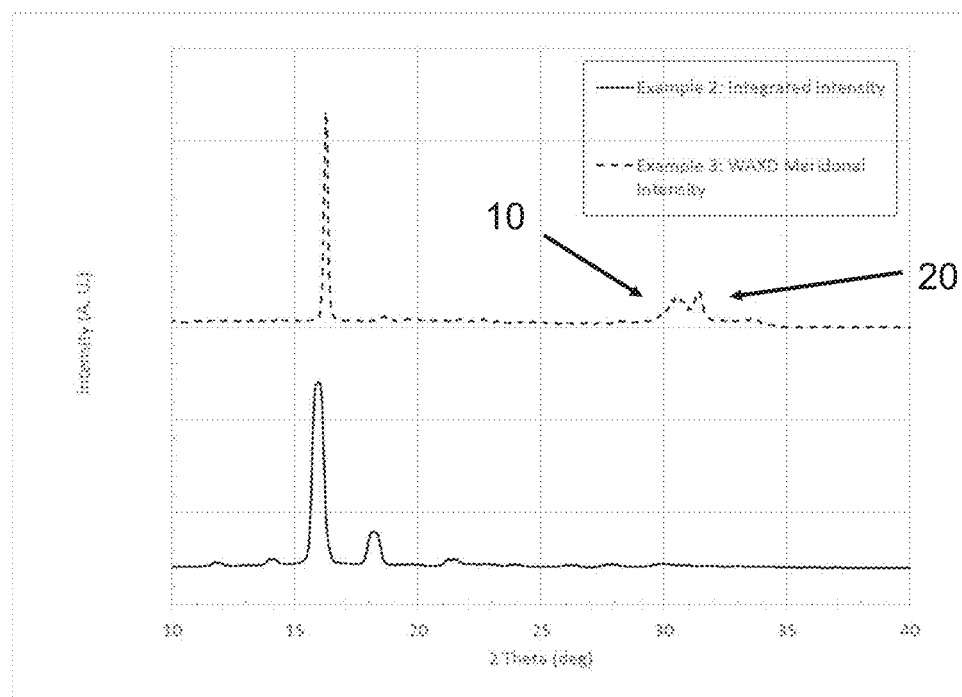
FIG. 3 is an intensity vs. 2-theta plot of the wide angle X-ray diffraction (WAXD) patterns of FIG. 1 and FIG. 2 comparing the integrated intensity of Example 2 with the meridonal intensity of Example 3 in accordance with at least one embodiment.

The WAXD pattern shown in FIG. 1 indicates no evidence of beta phase crystals in the preform article. In contrast, the WAXD patterns shown in FIG. 2 of expanded PLLA are consistent with conversion of as polymerized crystalline phases into a beta crystalline phase. It is to be noted that the beta crystal is primarily located in the fibrils. A useful signal for the presence of beta phase crystals is the observation by WAXD of (023)Beta peak depicted by reference numeral 20 and (003)Beta peak depicted by reference numeral 10 as shown in FIG. 3. FIG. 3 is a 2-theta vs intensity plot of the WAXD patterns of FIG. 1 and FIG. 2 comparing the integrated intensity of Example 2 with the meridonal intensity of Example 3.

Figure 8:
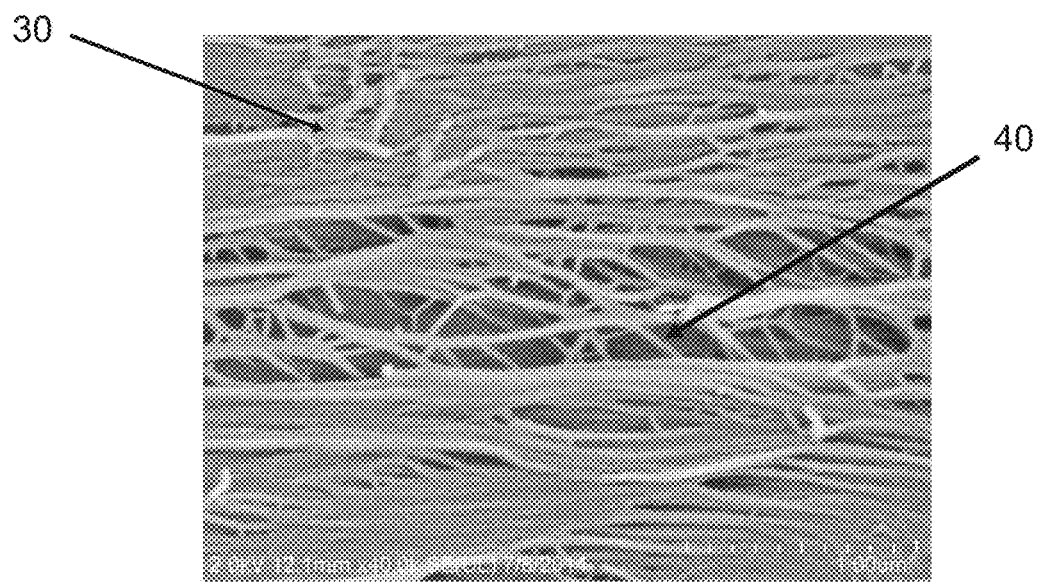
FIG. 8 is a scanning electron micrograph (SEM) of the surface of an interior view of the expanded porous PLLA polymer of Example 3 taken at 40,000× magnification in accordance with one embodiment of the invention.
Figure 9:
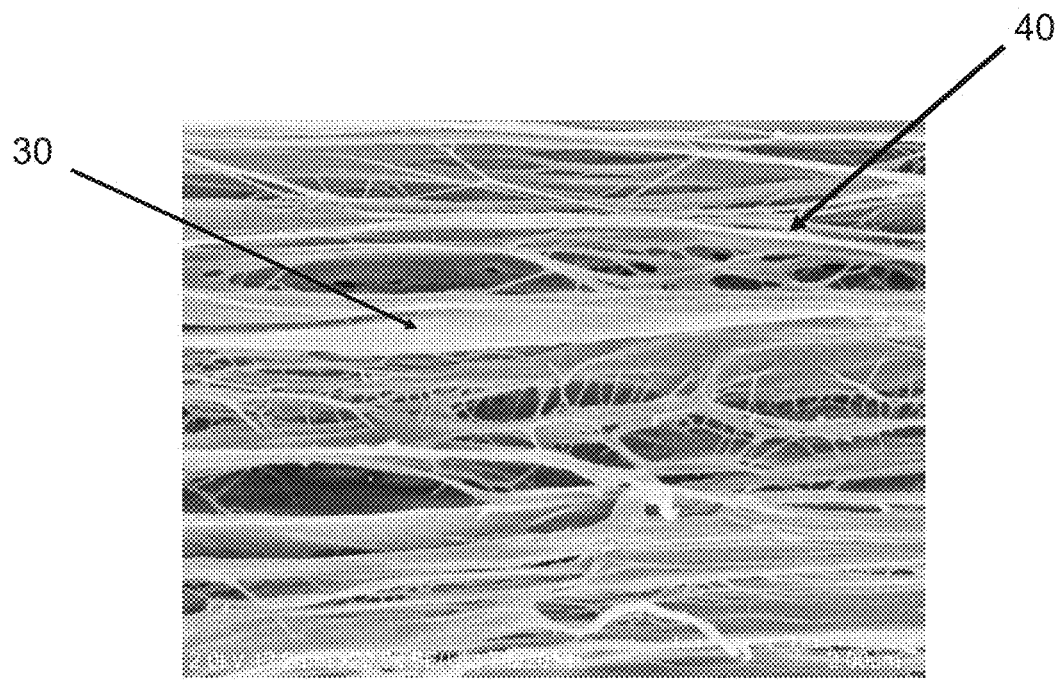
FIG. 9 is a scanning electron micrograph (SEM) of the surface of an interior view of the expanded porous PLLA polymer of Example 4 taken at 20,000× magnification according to an embodiment.
Figure 10:
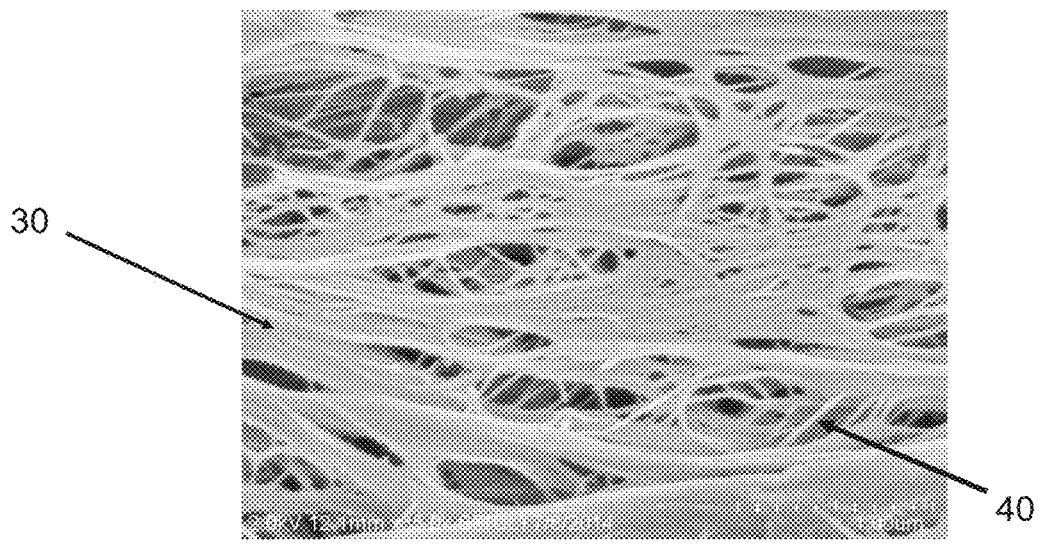
FIG. 10 is a scanning electron micrograph (SEM) of the surface of an interior view of the expanded porous PLLA polymer of Example 5 taken at 35,000× magnification in accordance with an embodiment.

The degree of fibrillation, porosity, and beta-crystal content increases with increasing expansion, with expansions of 400%, 600%, and greater being easily achieved. Expansion of the PLA polymer preform, either uniaxial or biaxial, may be conducted at rates up to 1,000%/second, up to 5,000%/second, up to 10,000%/second, or from about 1%/second to about 5,000%/second, or from about 1% to 10,000%/second. The expansion ratios may be greater than 3:1, greater than 5:1, greater than 7:1, greater than 10:1, greater than 15:1, greater than 20:1, greater than 25:1, greater than 30:1, greater than 35:1, greater than 40:1, greater than 45:1, or greater than 50:1. When the PLA polymer preform is expanded, it forms an expanded PLA polymer article that has a microstructure of nodes and fibrils, such as is shown at least in FIGS. 8, 9, and 10. FIGS. 8, 9, and 10 depict exemplary nodes 30 and fibrils 40 in the expanded PLA polymer article.

In addition, the PLA polymer expanded article may be formed into a densified PLA material with a porosity less than about 10%, or less than about 5%. In one embodiment, the PLA polymer article may be compressed at a temperature from at least about 1° above the glass transition temperature to at least about 1° C. below the melt temperature of the PLA polymer, or from about 60° C. to about 185° C. The initial expanded form is largely opaque. The largely opaque sample may then be compressed to form a sample that is largely translucent and dense. It is to be understood to one of skill in the art that various times, temperatures, and pressure may be utilized to achieve a densified article.

PLA Powder Article Formation

In another embodiment, a microporous PLA polymer article is formed from PLA powder. In this embodiment, the PLA polymers have an inherent viscosity of greater than about 3.8 dL/g and a calculated molecular weight greater than about 190,000 g/mol. The PLA polymers can be formed into microporous articles at temperatures below the melting point of the PLA polymer.

The PLA polymer powder may be formed by the process set forth above, with the exception that the polymerization process is stopped at about 40% completion. At lactide to PLA polymer conversion, the reaction mass is a slush of liquid lactide and crystalline PLA polymer particles. This reaction mixture is permitted to cool and solidify. Once cooled, the solidified mass of PLA polymer is broken into small pieces. In one embodiment, the mass of PLA polymers is broken by hand. The lactide is extracted from the broken pieces with acetone in an appropriate extractor (e.g., a Soxhlet extractor), which leaves behind PLA polymer powder. Agglomerations of the PLA polymer powder may be broken and sifted using an appropriately sized sizing screen.

Alternatively, the PLA polymer powder may be formed through precipitation in which poly-L-lactide is added to anhydrous o-xylene, heated, and then cooled to room temperature. A PLA precipitate is then filtered from the o-xylene. Hexanes may be added to the PLA precipitate to form a hexane/PLA slurry. A lubricant (e.g., a light mineral oil) may be added to the slurry. A free-flowing PLA polymer powder is obtained after the hexanes have been evaporated.

As with the bulk polymerization described above, solution viscosity may be used to calculate the molecular weight of the PLA polymers in a powder form. The PLA polymers may have an inherent viscosity greater than about 3.8 dL/g, greater than about 4.5 dL/g, greater than about 5.0 dL/g, greater than about 6.0 dL/g, or greater than about 7.0 dL/g. The PLA polymers have a calculated molecular weight (Mw) greater than about 190,000 g/mol, greater than about 250,000 g/mol, greater than about 290,000 g/mol, greater than about 380,000 g/mol, or greater than about 490,000 g/mol.

Paste Processing PLA Polymer Powder

In one embodiment, the PLA polymer powder may be formed into a microporous article through paste processing the PLA polymer powder. In forming a porous article from a PLA polymer powder, the PLA polymer powder is first mixed with a lubricant, such as a light mineral oil. Other suitable lubricants include aliphatic hydrocarbons, aromatic hydrocarbons, and the like, and are selected according to flammability, evaporation rate, and economic considerations. It is to be appreciated that the term "lubricant", as used herein, is meant to describe a processing aid that includes (or consists of) an incompressible fluid that is not a solvent for the polymer at the process conditions. The fluid-polymer surface interactions are such that it is possible to create a homogenous mixture. It is also to be noted that that choice of lubricant is not particularly limiting and the selection of lubricant is largely a matter of safety and convenience. It is to be appreciated that any of the lubricants described herein may be utilized as the lubricant so long as the fluid-polymer surface interactions are such that it is possible to create a homogenous mixture. The lubricant may be added to the PLA polymer powder in a ratio from about 1 ml/100 g to about 100 ml/100 g or from about 10 ml/100 g to about 70 ml/100 g.

In at least one embodiment, the PLA polymer powder and lubricant are mixed so as to uniformly or substantially uniformly distribute the lubricant in the mixture. It is to be appreciated that various times and mixing methods may be used to distribute the PLA polymer powder in the mixture. Once blended, PLA polymer powder/lubricant mixture is in a paste-like state. The PLA polymer powder can be formed into solid shapes (e.g. fibers, tubes, tapes, sheets, three dimensional self-supporting structures, etc.) without exceeding the melt temperature of the PLA polymer. In one or more exemplary embodiment, the lubricated PLA polymer powder is heated to a point below the melting temperature of the PLA polymer powder and sufficient pressure and shear are applied to form inter-particle connections and create a solid form. The lubricated PLA polymer powder can be formed into solid shapes such as fibers, tubes, tapes, sheets, three dimensional self-supporting structures, etc. without exceeding the melt temperature of the polymer. Non-limiting examples of methods of applying pressure and shear include ram extrusion (e.g., typically called paste extrusion or paste processing when lubricant is present) and calendering.

In one embodiment, the lubricated PLA polymer powder is ram extruded to produce a cohesive tape. As used herein, the term "cohesive tape" is meant to describe a tape that is sufficiently strong for further processing. The ram extrusion occurs below the melting temperature of the PLA polymer. In at least one alternate embodiment, the lubricated PLA polymer powder may be calendered at a temperature below the melting temperature of the PLA polymer to produce a cohesive tape. The calendering occurs at temperatures from at least about 1° above the glass transition temperature to at least about 1° C. below the melt temperature of the PLA polymer, or from about 60° C. to about 185° C. The tape formed has an indeterminate length and a thickness less than about 1 mm. Tapes may be formed that have a thickness from about 0.01 mm to about 1 mm from about 0.08 mm to about 0.5 mm, or from 0.05 mm to 0.2 mm, or even thinner.

In exemplary embodiments, the tape has a thickness from about 0.05 mm to about 0.2 mm.

In a subsequent step, the lubricant may be removed from the tape. In instances where a mineral oil is used as the lubricant, the lubricant may be removed by washing the tape in hexane or other suitable solvent. The wash solvent is chosen to have excellent solubility for lubricant and sufficient volatility to be removed below the melting point of the PLA polymer. If the lubricant is of sufficient volatility, the lubricant may be removed without a washing step, or it may be removed by heat and/or vacuum. The tape is then optionally permitted to dry, typically by air drying. However, any conventional drying method may be used as long as the temperature of heating the sample remains below the melting point of the PLA polymer.

The tapes, once dried, may be continuously processed or they may be cut to suitable sizes for expansion. Expansion of the samples occurs at temperatures below the melt temperature of the PLA polymer and above the glass transition temperature (Tg) of the PLA polymer. Expansion occurs below the melting point of the PLA polymer, such as, for example, about 80° C. below the melting point of the PLA copolymer, about 70° C. below the melting point, about 60° C. below the melting point, about 50° C. below the melting point, about 40° C. below the melting point, about 30° C. below the melting point, about 25° C. below the melting point, about 15° C. below the melting point, about 10° C. below the melting point, about 5° C. below the melting point or about 1° C. below the melting point. The samples may be expanded in one or more directions to form a porous PLA membrane. Additionally, the expansion ratios may be greater than 3:1, greater than 5:1, greater than 7:1, greater than 10:1, greater than 15:1, greater than 20:1, greater than 25:1, greater than 30:1, greater than 35:1, greater than 40:1, greater than 45:1, or greater than 50:1.

The porous microstructure of the expanded membrane is affected by the temperature and rate at which it is expanded. The geometry of the nodes and fibrils can be controlled by the selection of PLA polymer, the rate of expansion, temperature of expansion, and/or ultimate expansion ratio.

The expanded PLA polymer articles made in accordance with the processes described herein have a matrix tensile strength greater than or equal to 110 MPa, greater than or equal to 150 MPa, or greater than or equal to 200 MPa. Further, the PLA polymer articles have a matrix modulus greater than or equal to 3000 MPa, greater than or equal to 4000 MPa, or greater than or equal to 5000 MPa.

In addition, the expanded PLA polymer articles have a percent porosity that is greater than about 10%, greater than or equal to about 15%, greater than or equal to about 20%, greater than or equal to about 25%, greater than or equal to about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, greater than or equal to about 80%, greater than or equal to about 85%, or up to (and including) 90%. In exemplary embodiments, the PLA polymer articles may have a percent porosity from about 25% to about 90%, from about 40% to about 90%, from about 50% to about 90%, or from about 60% to about 90%.

Dry Processing PLA Polymer Powder

In yet another embodiment, the PLA polymer powder is calendered to produce a cohesive dense tape. The dry processing of the PLA polymer powder forms beta crystals. The calendering occurs at temperatures from at least about 1° above the glass transition temperature to at least about 1° C. below the melt temperature of the PLA polymer, or from about 60° C. to about 185° C. The tape formed has an indeterminate length and a thickness less than about 1 mm. Tapes may be formed that have a thickness from about 0.01 mm to about 1 mm from about 0.08 mm to about 0.5 mm, or from 0.05 mm to 0.2 mm, or even thinner. In exemplary embodiments, the tape has a thickness from about 0.05 mm to about 0.2 mm. It is to be understood to one of skill in the art that various times, temperatures, and pressures may be utilized to achieve a densified article.

The dense tape may be continuously processed or may be cut to suitable sizes for expansion. Expansion of the dry tape occurs at temperatures below the melt temperature of the PLA polymer and above and above the glass transition temperature (Tg) of the PLA polymer. In at least one embodiment, the expansion occurs about 80° C. below the melting point of the PLA copolymer, about 70° C. below the melting point, about 60° C. below the melting point, about 50° C. below the melting point, about 40° C. below the melting point, about 30° C. below the melting point, about 25° C. below the melting point, about 15° C. below the melting point, about 10° C. below the melting point, about 5° C. below the melting point or about 1° C. below the melting point. The expansion may be in one or more directions to form a dense PLA article. Additionally, the expansion ratios may be greater than 3:1, greater than 5:1, greater than 7:1, greater than 10:1, greater than 15:1, greater than 20:1, greater than 25:1, greater than 30:1, greater than 35:1, greater than 40:1, greater than 45:1, or greater than 50:1.

The incorporation of filler materials and/or coatings in or on the PLA polymer articles described herein is considered to be within the purview of the invention. For instance, a filler material may be blended with a PLA polymer before calendaring or ram extruding (and optionally expansion), or may be positioned on the PLA polymer article and locked in place with a suitable hydrogel. Non-limiting examples of suitable filler materials include inorganic materials (e.g., silica) carbon black, aerogels, metals, semi-metals, ceramics, carbon/metal particulate blends, activated carbon, hydrogel materials, bioactive substances, stiffening agents, and combinations thereof. Filler materials may be incorporated into the PLA polymer article in amounts from about 1.0% to about 80%, or from about 20% to about 60%, or from about 1% to about 30% by weight of the PLA article. Alternatively, suitable non-reactive filler materials may be incorporated into the PLA polymer articles during polymerization of the PLA polymer.

Various components can be coprocessed with or placed on and/or within the PLA articles. In particular, components (or chemical compositions) may be added to the PLA polymer either during or after polymer synthesis in such a manner that the added component(s) become intimately mixed in the polymer, such as in a blend or as a covalently bonded component of the PLA polymer chain. The added components could alternatively, or additionally, be placed outside the polymer on surfaces of the fibrils of the expanded PLA polymer. Further, the components may be placed within void spaces (e.g., pores) or between the fibrils in the expanded PLA article. The components added to or within the PLA article may be absorbable or non-absorbable. The added compositions can include useful substances that are releasably contained therein.

The components may include viscous chemical compositions, such as, but not limited to, a hydrogel material. Biologically active substances may optionally be combined with a hydrogel material or with any other added chemical component. With hydrogel materials, for example, the biologically active substances may be released directly from the hydrogel material or they may be released as the hydrogel material and the underlying expanded material are absorbed by the body of an implant recipient.

Suitable hydrogel materials include, but are not limited to, polyvinyl alcohol, polyethylene glycol, polypropylene glycol, dextran, agarose, alginate, carboxymethylcellulose, hyaluronic acid, polyacrylamide, polyglycidol, poly(vinyl alcohol-co-ethylene), poly(ethyleneglycol-co-propyleneglycol), poly(vinyl acetate-co-vinyl alcohol), poly(tetrafluoroethylene-co-vinyl alcohol), poly(acrylonitrile-co-acrylamide), poly(acrylonitrile-co-acrylic acid-acrylamidine), poly(acrylonitrile-co-acrylic acid-co-acrylamidine), polyacrylic acid, poly-lysine, polyethyleneimine, polyvinyl pyrrolidone, polyhydroxyethylmethacrylate, polysulfone, mercaptosilane, aminosilane, hydroxylsilane, polyallylamine, polyaminoethylmethacrylate, polyomithine, polyaminoacrylamide, polyacrolein, acryloxysuccinimide, or their copolymers, either alone or in combination. Suitable solvents for dissolving the hydrophilic polymers include, but are not limited to, water, alcohols, dioxane, dimethylformamide, tetrahydrofuran, and acetonitrile, etc.

Optionally, the compositions can be chemically altered after being combined with the expanded PLA polymer. These chemical alterations can be chemically reactive groups that interact with polymeric constituents of the expanded PLA polymer or with chemically reactive groups on the compositions themselves. The chemical alterations to these compositions can serve as attachment sites for chemically bonding yet other chemical compositions, such as biologically active substances. "Bioactive substances" include enzymes, organic catalysts, ribozymes, organometallics, proteins, glycoproteins, peptides, polyamino acids, antibodies, nucleic acids, steroidal molecules, antibiotics, antimycotics, cytokines, carbohydrates, oleophobics, lipids, extracellular matrix material and/or its individual components, pharmaceuticals, and therapeutics. One non-limiting example of a chemically-based bioactive substance is dexamethasone. Cells, such as, mammalian cells, reptilian cells, amphibian cells, avian cells, insect cells, planktonic cells, cells from non-mammalian marine vertebrates and invertebrates, plant cells, microbial cells, protists, genetically engineered cells, and organelles, such as mitochondria, are also bioactive substances. In addition, non-cellular biological entities, such as viruses, virenos, and prions are considered bioactive substances herein.

Besides the utilization of added components for chemically or biologically active functions, the added components may also (or alternatively) serve a physical or mechanical function. For example, the added component can act as a void filler to facilitate further modification either prior to or during implantation. Such use of a carvable implant material may be of particular benefit for use in surgery, especially in plastic and reconstructive surgery. The material may include a porous expanded structure having a coating of a biocompatible stiffening agent to render the porous construct adequately rigid for carving to better adapt the implant for its intended use. The coating may be applied in a manner that allows the porous construct to become impregnated by the stiffening agent. Stiffening agents as used herein would be composed of one or more absorbable materials, including synthetic biodegradable polymers and biologically derived materials which, if degrading faster than the base structure, would allow delayed ingrowth of tissue into the porous construct after the stiffening agent is degraded through absorption.

Suitable materials for a polymeric biodegradable support member include, but are not limited to, polyglycolide (PGA), copolymers of glycolide, glycolide/L-lactide copolymers (PGA/PLLA), lactide/trimethylene carbonate copolymers (PLA/TMC), glycolide/trimethylene carbonate copolymers (PGA/TMC), polylactides (PLA), stereo-copolymers of PLA, poly-L-lactide (PLLA), poly-DL-iactide (PDLLA), L-lactide/DL-lactide copolymers, copolymers of PLA, lactide/tetramethylglycolide copolymers, lactide/.alpha.-valerolactone copolymers, lactide/.epsilon.-caprolactone copolymers, hyaluronic acid and its derivatives, polydepsipeptides, PLA/polyethylene oxide copolymers, unsymmetrical 3,6-substituted poly-1,4-dioxane-2,5-diones, poly-.beta.-hydroxybutyrate (PHBA), poly-4-hydroxybutyrate (P4HB), P4HB/PHBA copolymers, PHBA/bhydroxyvalerate copolymers (PHBA/HVA), poly-p-dioxanone (PDS), poly-a-valerlactone, poly-e-caprolactone, methacrylate-N-vinyl-pyrrolidone copolymers, polyesteramides, polyesters of oxalic acid, polydihydropyranes, polyalkyl-2-cyanoacrylates, polyurethanes, polyvinylalcohol, polypeptides, poly-B-malic acid (PMLA), poly-B-alcanoic acids, polybutylene oxalate, polyethylene adipate, polyethylene carbonate, polybutylene carbonate, and other polyesters containing silyl ethers, acetals, or ketals, alginates, and blends or other combinations of the aforementioned polymers. In addition to the aforementioned aliphatic link polymers, other aliphatic polyesters may also be appropriate for producing aromatic/aliphatic polyester copolymers. These include aliphatic polyesters selected from the group of oxalates, malonates, succinates, glutarates, adipates, pimelates, suberates, azelates, sebacates, nonanedioates, glycolates, and mixtures thereof. These materials are of particular interest as biodegradable support membranes in applications requiring temporary support, such as during tissue or organ regeneration.

Test Methods

It should be understood that although certain methods and equipment are described below, other methods or equipment determined suitable by one of ordinary skill in the art may be alternatively utilized. It is to be understood that the following examples were conducted on a lab scale but could be readily adapted to a continuous or semi-continuous process.

Scanning Electron Microscopy (SEM)

SEM images were collected using an Hitachi SU8000 FE Ultra High Resolution Scanning Electron Microscope with Dual SE detectors. Cross-sectioned samples were prepared using a Cooled straight-razor blade method. Surface and cross-sectioned samples were mounted onto a 25 mm diameter metal stub with a 25 mm carbon double sided adhesive. The mounted samples were sputter coated with platinum.

Powder Wide Angle X-Ray Diffraction (WAXD

Diffraction patterns from calendered PLA powder were collected using a Bruker Discovery D-8 instrument. The X-Ray source was CuKα element with a wavelength of 0.1542 nm running at 40 kV/60 mA. The instrument was configured in a Brentano-Bragg geometry. Diffraction intensity was measured using a OD scintillation counter rotating at 0.02 degree 2-theta increments for a one second duration. The range of 2-theta was 10 degrees to 35 degrees. The instrument was calibrated using a polycrystalline silicon and an automated internal calibration algorithm. PLA polymer was placed on the Bruker Discovery D-8 stage and aligned with the beam line.

2-Dimensional Wide Angle X-Ray Diffraction (WAXD)—Method 1

Diffraction patterns from PLA polymer and expanded films were collected using a Molecular Metrology instrument configured for 2-D WAXD observations. The X-Ray source was a Rigaku MicroMax Sealed Micro Source CuKα element with a wavelength of 0.1542 nm running at 45 kV/66 mA. To collect two-dimensional diffraction information at wide angles a 20 cm×20 cm Fujifilm BAS SR2040 imaging plate was placed in the instrument vacuum chamber perpendicular to the X-Ray beam line at a camera length of 146 mm. Camera length was calibrated by collecting a WAXD pattern from a tricosane standard and calculating the camera length from the 110 reflection at q of 15.197 $nm^{-1}$ or d-spacing 0.4134 nm. PLLA polymer billets approximately 1.5 mm thick were placed on a motorized stage and aligned perpendicular to the beam line. The vacuum chamber was then sealed and evacuated to 500 mTorr below atmospheric pressure and the beam shutter opened. Diffraction patterns were collected at ambient temperature for a period of 0.5 to 1 hour, depending on the thickness and scattering intensity of the film sample. The diffraction data were collected from the Fujifilm BAS SR2040 image plates using a General Electric Typhoon FLA7000 image plate reader. Diffraction pattern images were saved as grayscale TIFF files and subsequently analyzed using POLAR analysis software.

2-Dimensional Wide Angle X-Ray Diffraction (WAXD)—Method 2

Diffraction patterns from PLA powder and films were collected using a SaxLab Ganesha instrument configured for 2-D WAXD observations. The X-Ray source was a sealed CuKα element with a wavelength of 0.1542 nm running at 45 kV/66 mA. To collect two-dimensional diffraction information at wide angles a 0.3M Pilatus photon counting detector with pixel dimensions of 175 um×175 um was placed in the instrument vacuum chamber perpendicular to the X-Ray beam line at a camera length of 101 mm. Camera length was calibrated by collecting a WAXD pattern from a silver behanate standard. Powder and film samples approximately 0.5 mm thick were placed on a motorized stage and aligned perpendicular to the beam line. The vacuum chamber was then sealed and evacuated to 500 mTorr below atmospheric pressure and the beam shutter opened. Diffraction patterns were collected at ambient temperature for a period of 10 minutes. Diffraction pattern images were saved as grayscale TIFF files and subsequently analyzed using POLAR analysis software.

Gurley Flow

The Gurley air flow test measures the time in seconds for 100 $cm^3$ of air to flow through a 6.45 $cm^2$ aperture at 12.4 cm of water pressure. An aperture of 0.645 $cm^2$ was actually used and the time observed divided by a factor of 10 to normalize observations for the aperture size. The actual air volume was 300 $cm^3$ and the time observed divided by an additional factor of 3 to normalize observations for the volume size. Thus, the measured time was divided by a total factor of 30 to obtain the Gurley flow. The samples were measured in a Gurley Densometer Model 4110 Automatic Densometer equipped with a Gurley Model 4320 automated digital timer. The reported result is the average of 3 measurements.

Differential Scanning Calorimetry

DSC data were collected using a TA Instruments Q2000 DSC between 0° C. and 250° C. using a heating rate of 10° C./min. Approximately 5 to 10 mg of the sample was placed into a standard Tzero pan and lid combination available from TA Instruments. A linear integration method from 140° C. to 200° C. was used to integrate to obtain the first melt enthalpy data.

Solution Viscosity

A sample of the virgin polylactate polymer resin was dissolved into chloroform solvent. Using the results from proton NMR, the weight of the virgin polymer resin added to the chloroform was adjusted to give a solution concentration of 0.1 g/dL of actual polymer. Solution was charged to a Cannon #75 capillary L158 solution viscometer, which was then immersed in a 25.0 C water bath and equilibrated for 15 minutes. The formula used to calculate inherent viscosity was as follows:

$$\eta_{inh} = \frac{\ln \frac{t}{t_s}}{C}$$

Where: $\eta_{inh}$ = inherent viscosity (dL/g)

$t$ = elution time of the solution (s)

$t_s$ = elution time of the solvent (s)

$C$ = polymer concentration (g/dL);

$$= \frac{\frac{1}{\text{polymer fraction}} \cdot wt \text{ virgin polymer resin (g)}}{\text{Volume (dL)}}$$

Solution-Viscosity Molecular Weight

A relationship between solution viscosity and molecular weight of PLLA in chloroform at 25° C. has been proposed as follows (D. W. Grijpma, J. P. Pennings, and A. J. Pennings, Colloid Polym Sci 272:1068-1081, 1994):

$$[\eta] = 5.45 \cdot 10^{-4} \cdot M_v^{0.73} \quad \text{(Equation 1)}$$

Where: $[\eta]$=intrinsic viscosity (dL/g)

$M_v$=Solution-viscosity molecular weight

Intrinsic viscosity may be calculated by measuring inherent viscosity at several concentrations, and in the region where the inherent viscosity-concentration relationship is linear, extrapolating a line to zero concentration (ASTM D2857-95). For polymer-solvent systems such as PLLA in chloroform, the slopes of the inherent viscosity vs. concentration line change very little for samples described herein. The approximate intrinsic viscosity was estimated from a single-concentration measurement according to the following formula (F. W. Billmeyer, J Polymer Science 1949 4(1):83-86):

$$[\eta] = \frac{4}{c}(\eta_r^{1/4} - 1) \quad \text{(Equation 2)}$$

Where: $[\eta]$ = intrinsic viscosity (dL/g)

$\eta_r$ = relative viscosity $\cong \frac{t}{t_s}$ $c$ = polymer concentration (g/dL);

Substituting Equation 2 into Equation 1:

$$\frac{4}{c}(\eta_r^{1/4} - 1) = 5.45 \cdot 10^{-4} \cdot M_v^{0.73} \quad \text{(Equation 3)}$$

Rearranging Equation 3 to solve directly for solution-viscosity molecular weight:

$$M_v = e^{\frac{1}{0.73} \cdot \ln\left(\frac{\frac{4}{c}(\eta_r^{1/4} - 1)}{5.45 \cdot 10^{-4}}\right)} \quad \text{(Equation 4)}$$

Thickness Measurement

Thickness was measured by placing the sample between the two plates of a Mitutoyo Model ID-C112EX thickness gauge mounted on a Mitutoyo Model 7004 cast base (Mitutoyo Corporation, Kawasaki, Japan). The average of 3 measurements was reported.

Porosity Calculation

Porosity is reported as the volume fraction of void space measured in the microporous PLA article. Density was used to calculate the porosity of expanded materials, using 1.23 g/cc as an approximation of the full density of the PLA samples. The relative crystal content of the polymer affects the density of the polymer. Uniaxially stretched samples were die cut to form strips. Each sample was weighed using a Sartorius Model MC 210 P balance, and then the thickness of the samples was taken using a Mitutoyo thickness gauge (Mitutoyo Corporation, Kawasaki, Japan). Using this data, the bulk density of uniaxially expanded samples were calculated with the following formula:

$$\rho_{bulk} = \frac{m}{w \cdot l \cdot t}$$

where: $\rho_{bulk}$=bulk density (g/cc)
m=mass (g)
w=width (cm)
l=length (cm)
t=thickness (cm).

Biaxially stretched samples were die cut as circles, and the bulk density calculated as follows:

$$\rho_{bulk} = \frac{m}{\pi \cdot r^2 \cdot t}$$

where: $\rho_{bulk}$=bulk density (g/cc)
m=mass (g)
π=3.142
r=radius (cm)
t=thickness (cm)

Porosity is calculated as:

$$P = 100 \cdot \left(1 - \frac{\rho_{bulk}}{\rho}\right)$$

where: P=% porosity
$\rho_{bulk}$=bulk density (g/cc)
ρ=polymer density, 1.23 g/cc.

Matrix Tensile Strength and Matrix Modulus

Tensile break load was measured using an INSTRON 5500R tensile test machine equipped with flat-faced grips and a 900 N load cell. The gauge length was 19 mm and the cross-head speed was 20.3 cm/min. For longitudinal MTS measurements, the larger dimension of the sample was oriented in the calendering direction, which was designated the "machine direction". For the transverse MTS measurements, the larger dimension of the sample was oriented perpendicular to the calendering direction, which was designated the "transverse direction".

The sample from the density measurement was used for tensile testing. The sample dimensions were 50 mm in length, 5 mm in width, and approximately 0.5 mm thick. The effective thickness is calculated from the mass, the area, and the density of the sample. Two samples were then tested individually on the tensile tester. The average of the two maximum load (i.e., the peak force) measurements was reported. The longitudinal and transverse MTS were calculated using the following equation:

MTS=(maximum load/cross-section area)*(density of "Polymer")/density of the sample), wherein the density of PLA is taken to be 1.23 g/mL.

Matrix modulus is calculated using the following equation:

MatrixModulus=(small strain slope of load-displacement curve/cross-section area)*(density of "Polymer")/density of the sample.

Proton Nuclear Magnetic Resonance (NMR)

A sample for $^1$H Solution NMR collection was prepared by dissolving approximately 2 mg of polymer in approximately 2 mL CDCl$_3$. A Bruker BioSpin Avance II 300 MHz system was used to collect $^1$H NMR data at 300.13 MHz. A Bruker BioSpin 5 mm BBFO probe was installed in a standard bore 7.05T Bruker BioSpin ultra-shielded superconducting magnet. Temperature during NMR acquisition was 300K (26.9° C.). Software used for data acquisition and data processing was Topspin 1.3 or higher. The data was collected and processed using the conditions specified in Table 1. The spectra were referenced to the chloroform peak at 7.27 ppm.

The methine proton appearing as a quadruplet between 5.00 to 5.10 ppm was assigned to lactate ester in the cyclic lactide form, and the methine proton appearing as a quadruplet between 5.12 to 5.24 ppm was assigned to lactate ester in the polymer form. Relative amounts of lactate ester in the form of lactide or polymer were determined by calculating the percent area of the quadruplet peaks with respect to each other.

TABLE 1

| NMR Acquisition Parameters | |
|---|---|
| $^1$H NMR Frequency | 300.13 MHz |
| Transmitter offset | 6.175 ppm |
| Spectral Width | 6188 Hz |
| Pulse Length (30°) | 3.9 microseconds |
| Acquired data points | 198018 |
| Acquisition Time | 16 seconds |
| Recycle delay | 5 seconds |
| Sample spinning speed | 20 Hz |
| Number of scans | 128 |
| Total data points after zero fill | 256k |
| Line broadening | 0.3 Hz |

EXAMPLES

Example 1

In a nitrogen purged glovebag, a 250 ml square glass bottle was filled to the top with L-lactide powder, then the bottle was closed with a polytetrafluoroethylene-lined polybutylene screw cap. The bottle was placed in a 130° C. oven and the L-lactide was melted. Additional L-lactide powder was added to the bottle, bringing the total charge weight to 314.87 g (2.1846 mol) of L-lactide. The screw cap was loosely placed upon the bottle, and the assembly placed in a vacuum chamber. Vacuum was drawn, then the chamber flooded with nitrogen. The bottle was removed from the chamber and the cap quickly tightened. The bottle was placed back in the 130° C. oven to continue the melting process.

When the L-lactide was completely melted, the cap was removed and 20.2 µl ($6.24 \times 10^{-5}$ mol) of stannous 2-ethylhexoanate, and 6.54 µl ($6.24 \times 10^{-5}$ mol) of 1,5-pentanediol were added to the bottle using a positive-displacement micro pipette. The bottle was vacuum/nitrogen purged and swirled. The bottle was then placed in a 110° C. oven, and swirled occasionally over the next few hours. After 7 days in the oven, the bottle was removed. The polymer billet formed therein was freed by breaking the glass bottle using a hammer.

Figure 4:
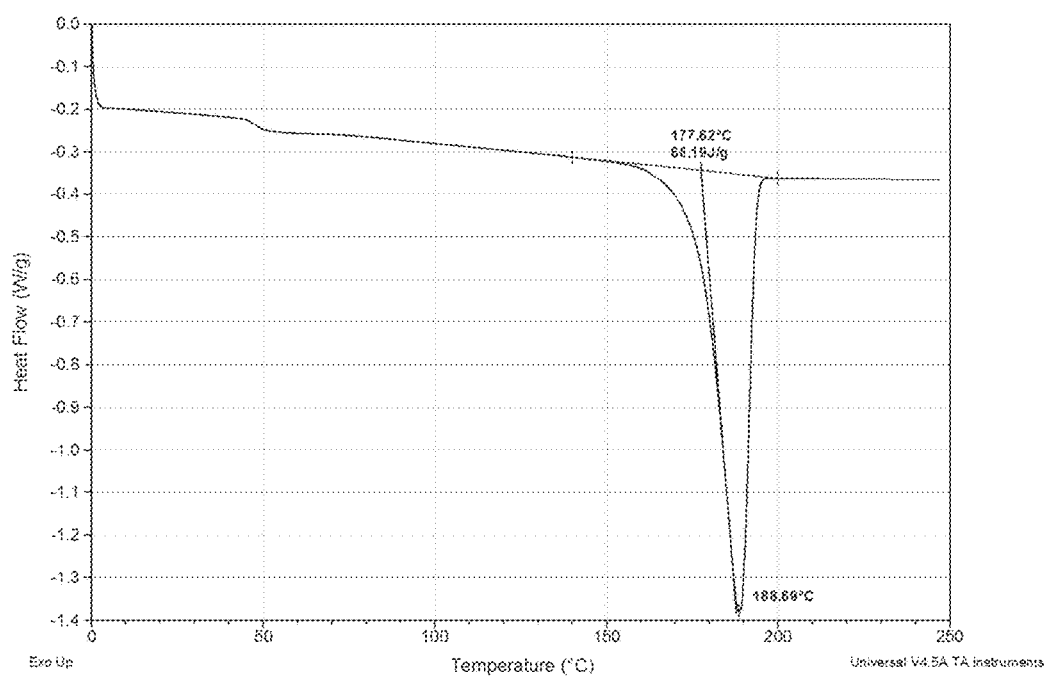
FIG. 4 is a differential scanning calorimetry (DSC) thermogram depicting a peak melting temperature and melt enthalpy of the unexpanded PLLA polymer of Example 1 according to at least one embodiment.

Analysis by proton nuclear magnetic resonance (NMR) showed 91.00% of lactate ester as polymer. Differential Scanning Calorimetry (DSC) measured a peak melting temperature at 188.69° C. with a melt enthalpy of 68.19 J/g. The DSC thermogram is depicted in FIG. 4. The inherent viscosity was determined to be 9.64 dL/g, and the corresponding solution-viscosity molecular weight was calculated to be 781,000 g/mol.

Example 2

The material of Example 1 was cut on a bandsaw into slices approximately 1 mm thick, approximately 20 mm width, approximately 50 mm length. A wide angle x-ray diffraction (WAXD) pattern of the PLLA polymer is shown in FIG. 1. The circular WAXD pattern of FIG. 1 and the graphical depiction of FIG. 3 show an absence of beta crystals.

Example 3

Figure 5:
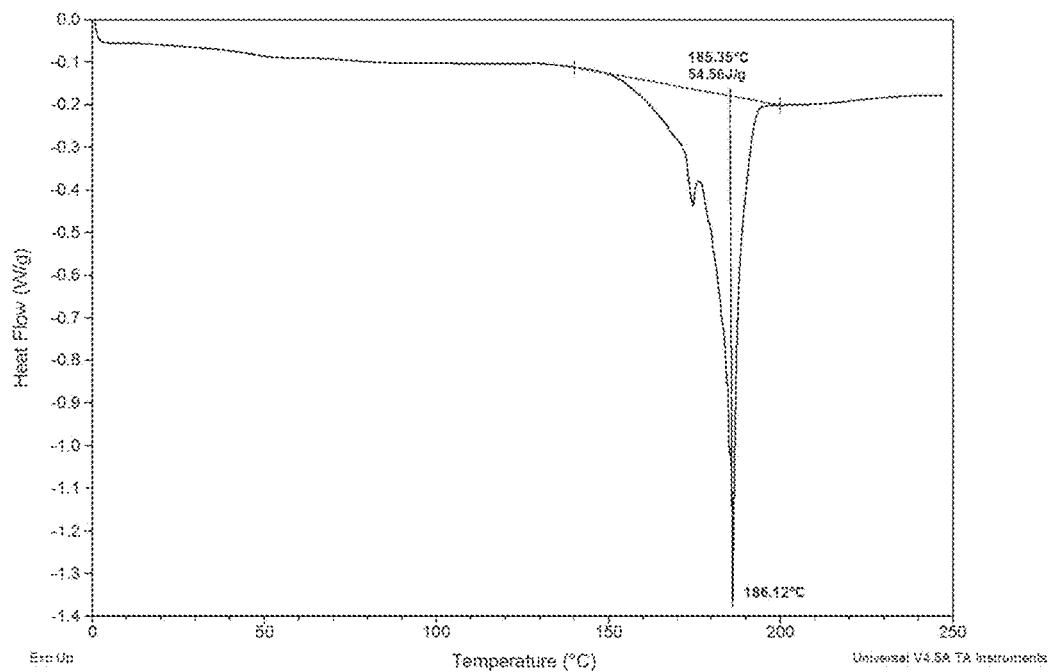
FIG. 5 is a differential scanning calorimetry (DSC) thermogram depicting a peak melting temperature and melt enthalpy of the expanded porous PLLA polymer of Example 3 according to at least one embodiment.

The slices of Example 2 were drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 170° C. The samples had a gauge length of 10 mm and were drawn uniaxially with a crosshead displacement rate of 0.1 mm/s. The total displacement was 40 mm. A microporous structure was observed using scanning electron microscopy (SEM). An SEM of the surface of an interior view of the expanded porous PLLA polymer taken at 40,000× magnification is shown in FIG. 8. The SEM shows the presence of nodes 30 and fibrils 40. Differential Scanning Calorimetry (DSC) measured the peak melting temperature of the polymer at 186.12° C. with a melt enthalpy of 54.56 J/g. The DSC thermogram is depicted in FIG. 5. The multiple peaks depicted in FIG. 5 indicate the presence of multiple crystal phases.

The WAXD pattern of FIG. 2 shows a single circular diffraction with a d-spacing that corresponds to the residual crystalline PLA monomer as well as numerous discrete diffraction spots in the equatorial and meridonal directions. This diffraction pattern and the associated d-spacings and the graphical depiction of FIG. 3 indicate the presence of beta crystals.

Example 4

Figure 6:
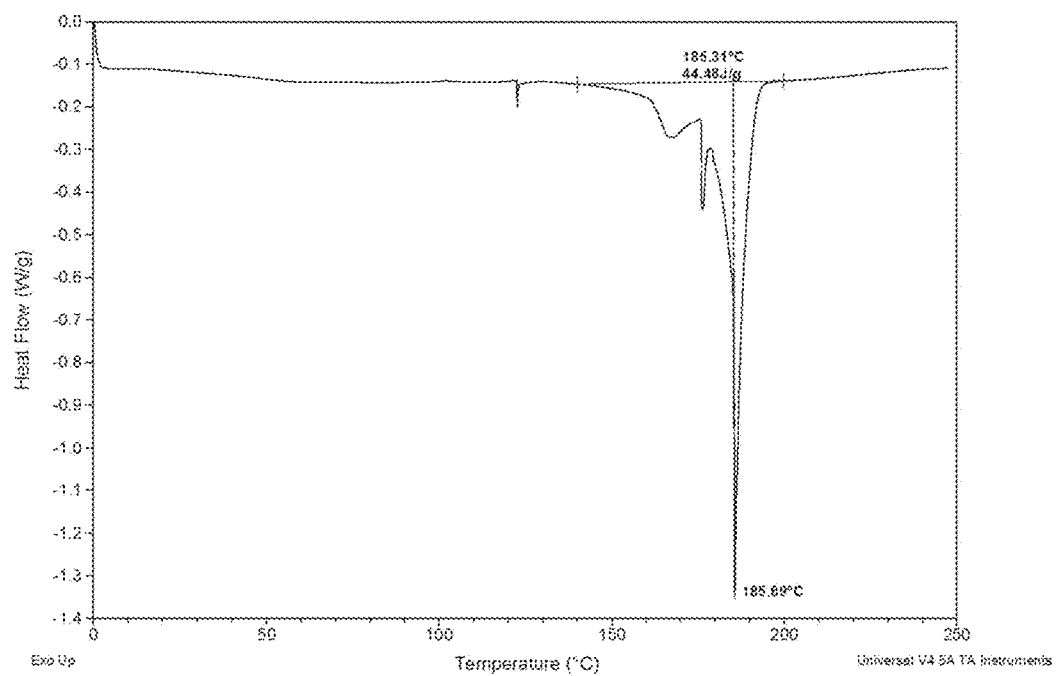
FIG. 6 is a differential scanning calorimetry (DSC) thermogram depicting a peak melting temperature and melt enthalpy of the expanded porous PLLA polymer of Example 4 in accordance with one embodiment.

The slices of Example 2 were drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 170° C. The samples had a gauge length of 10 mm and were drawn uniaxially with a crosshead displacement rate of 1 mm/s. The total displacement was 60 mm. A microporous structure was observed using scanning electron microscopy (SEM). An SEM of the surface of an interior view of the expanded porous PLLA polymer taken at 20,000× magnification is shown in FIG. 9. The SEM shows the presence of nodes 30 and fibrils 40. Differential Scanning calorimetry (DSC) measured a peak melting temperature of the polymer at 185.69° C. with a melt enthalpy of 44.48 J/g. The DSC thermogram is depicted in FIG. 6. The multiple peaks depicted in FIG. 6 indicate the presence of multiple crystal phases.

Example 5

Figure 7:
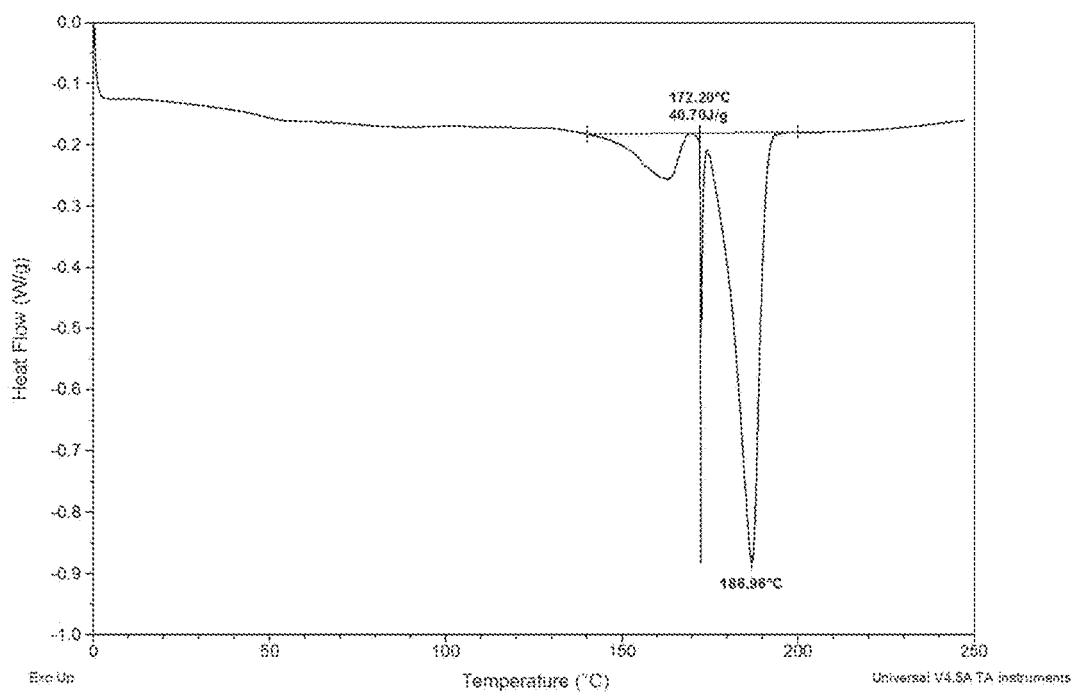
FIG. 7 is a differential scanning calorimetry (DSC) thermogram depicting a peak melting temperature and melt enthalpy of the expanded porous PLLA polymer of Example 5 according to at least one embodiment.

The slices of Example 2 were drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 170° C. The samples had a gauge length of 10 mm and were drawn uniaxially with a crosshead displacement rate of 10 mm/s. The total displacement was 60 mm. A microporous structure was observed using scanning electron microscopy (SEM). An SEM of the surface of an interior view of the expanded porous PLLA polymer taken at 35,000× magnification is shown in FIG. 10. The SEM shows the presence of nodes 30 and fibrils 40. Differential Scanning calorimetry (DSC) measured a peak melting temperature of the polymer at 186.96° C. with a melt enthalpy of 40.70 J/g. The DSC thermogram is depicted in FIG. 7. The multiple peaks depicted in FIG. 7 indicate the presence of multiple crystal phases.

Example 6

The slices of Example 2 were drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 170° C. The samples had a gauge length of 10 mm and were drawn uniaxially with a crosshead displacement rate of 100 mm/s. The total displacement was 60 mm. A microporous structure was visually observed using scanning electron microscopy (SEM).

Example 7

The slices of Example 2 were drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 170° C. The samples had a gauge length of 10 mm and were drawn uniaxially with a crosshead displacement rate of 500 mm/s. The total displacement was 40 mm. A microporous structure was visually observed using scanning electron microscopy (SEM).

Example 8

The slices of Example 2 were drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 180° C. The samples had a gauge length of 10 mm, were drawn uniaxially with a crosshead displacement rate of 10 mm/s. The total displacement was 60 mm. A microporous structure was visually observed using scanning electron microscopy (SEM).

Example 9

The slices of Example 2 were drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 160° C. The samples had a gauge length of 10 mm and were drawn uniaxially with a crosshead displacement rate of 10 mm/s. The total displacement was 60 mm. A microporous structure was visually observed using scanning electron microscopy (SEM).

Table 1 sets forth the results of Examples 2, 3-9, and 11.

TABLE 1

| ID | MTS MPa | Matrix Modulus MPa | Porosity % |
|---|---|---|---|
| Example 2 | 49.9 | 2898 | 0 |
| Example 3 | 175.7 | 5028 | 27.89 |
| Example 4 | 217.0 | 4458 | 28.45 |
| Example 5 | 172.5 | 3954 | 15.46 |
| Example 6 | 84.9 | 4284 | 12.6 |
| Example 7 | 159.6 | 4280 | 16.75 |
| Example 8 | 176.3 | 5002 | 20.47 |
| Example 9 | 173.7 | 4947 | 14.23 |
| Example 11 | 213.0 | 3919 | 21 |

Example 10

In order to get better release of the PLLA polymer from the glass reaction container, a 1 L cylindrical bottle was silanized by adding 1 ml of octadecyltrichlorosilane and 20 ml of chloroform, closing with a cap, shaking the bottle occasionally over several hours, and allowing the mixture to stand overnight. The bottle was then emptied, rinsed 5 times with 20 ml of chloroform for each rinse, then rinsed 2 times with 100 ml of a 1:1 solution of methanol and water, then rinsed several times with methanol and dried using nitrogen. The bottle was further dried by putting it into a 130° C. oven.

In a nitrogen purged glove box, 1000.2 g (6.934 mol) of L-lactide powder was added to the silanized bottle, which was then closed with a PTFE-lined polybutylene cap. The bottle was placed in a 130° C. oven and the L-lactide was melted. During the course of melting, degassing was done by drawing vacuum on the L-lactide to a level of about 3.0 Torr for one minute followed by pressurization with Nitrogen to 2 psig.

When the L-lactide was completely melted, the bottle was moved to a nitrogen glove box, the cap was removed, and 211.9 µl of catalyst solution was added to the bottle using a positive-displacement micro pipette. The catalyst solution consisted of 64.2 µl ($1.98 \times 10^{-4}$ mol) of stannous 2-ethyl-hexoanate and 147.7 µl of anhydrous toluene. The bottle was vacuum purged and swirled. The bottle was then placed in a 130° C. oven and swirled occasionally over a duration of 30 minutes. The bottle was then placed in a 110° C. oven. After 3 days in the oven, the bottle was removed. The polymer billet formed therein was freed by breaking the glass bottle.

Analysis by proton nuclear magnetic resonance (NMR) showed 93.6% of lactate ester as polymer. Differential Scanning Calorimetry (DSC) measured a peak melting temperature at 185.7° C. with a melt enthalpy of 65.5 J/g. The inherent viscosity was determined to be 10.2 dL/g and the corresponding solution-viscosity molecular weight was calculated to be 853,000 g/mol.

Example 11

The material of Example 10 was cut on a lathe into a slice approximately 1 mm thick. The slice was machined into a dogbone shape with a gauge length of 6 mm. The dogbone sample was drawn uniaxially in a tensile machine (Instron Model 5965 Norwood, Mass., 02062) equipped with a convection oven set to 145° C. The crosshead displacement rate was 100 mm/min and the total displacement was 62 mm. The porosity of the resultant expanded sample was calculated to be 21%.

Example 12

In order to get better release of the PLLA polymer from the glass reaction container, a 1 L cylindrical bottle was silanized by adding 1 ml of octadecyltrichlorosilane and 20 ml of chloroform, closing with a cap, shaking the bottle occasionally over several hours, and allowing the mixture to stand overnight. The bottle was then emptied, rinsed 5 times with 20 ml of chloroform for each rinse, and dried overnight in a 110° C. oven.

In a nitrogen purged glovebag, 999.01 g (6.9313 mol) of L-lactide powder was added to the silanized bottle, which was then closed with a PTFE-lined polybutylene cap. The bottle was placed in a 130° C. oven and the L-lactide was melted.

When the L-lactide was completely melted, the cap was removed and 64.2 µl ($1.98 \times 10^{-4}$ mol) of stannous 2-ethyl-hexoanate, and 20.7 µl ($1.98 \times 10^{-4}$ mol) of 1,5-pentanediol were added to the bottle using a positive-displacement micro pipette. The bottle was vacuum/nitrogen purged and swirled. The bottle was then placed in a 110° C. oven and swirled occasionally over the next few hours. After 16 days in the oven, the bottle was removed. The polymer billet formed therein was freed by breaking the glass bottle using a hammer.

Analysis by proton nuclear magnetic resonance (NMR) showed 90.35% of lactate ester as polymer. Differential Scanning Calorimetry (DSC) measured a peak melting temperature at 178.24° C. with a melt enthalpy of 42.92 J/g. The inherent viscosity was determined to be 8.84 dL/g and the corresponding solution-viscosity molecular weight was calculated to be 683,000 g/mol.

Example 13

The material of Example 12 was cut using a bandsaw into slices perpendicular to the cylinder axis to yield a disc approximately 5 mm thick and approximately 10 cm diameter. The disc was then milled on both faces to a consistent thickness.

Example 14

Figure 11:
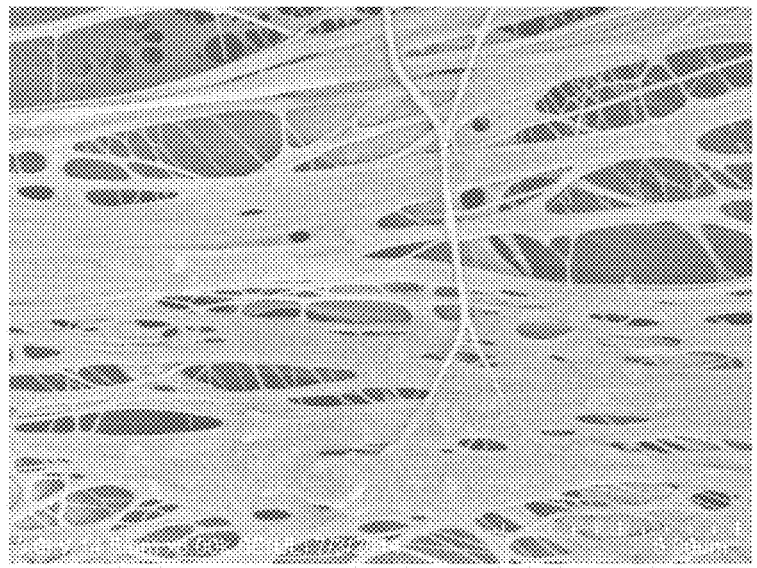
FIG. 11 is a scanning electron micrograph (SEM) of the surface of an interior view of the expanded porous PLLA polymer of Example 14 taken at 8,000× magnification in accordance with an embodiment.

A disc from Example 13 having a thickness of 3.0 mm was restrained in an apparatus capable of stretching the disc in all directions in the plane of the disc at an equal rate within a temperature controlled environment. The sample temperature was approximately 168° C. and the radial displacement rate was 1.27 mm/s. The total radial displacement was 134 mm. A microporous structure was observed using scanning electron microscopy (SEM). An SEM of the surface of an interior view of the expanded porous PLLA polymer taken at 8,000× magnification is shown in FIG. 11. The porosity of the sample was calculated to be 62.2%.

Example 15

Figure 12:
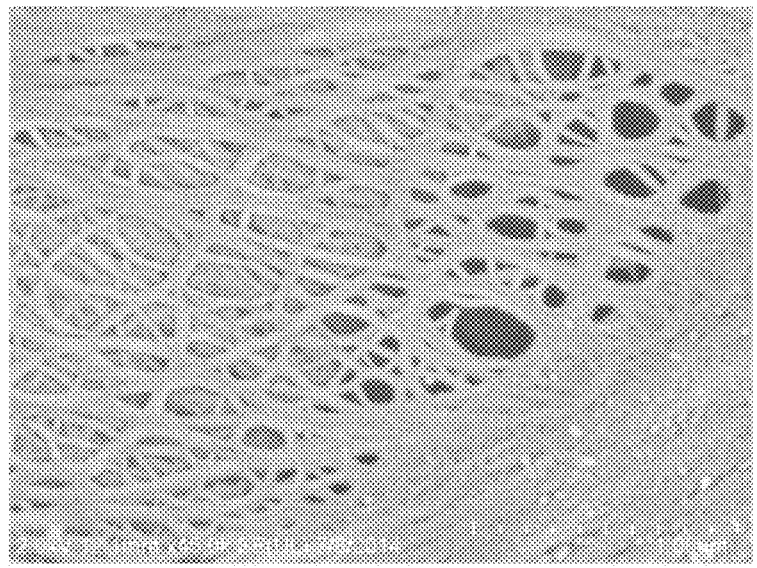
FIG. 12 is a scanning electron micrograph (SEM) of the surface of an interior view of the expanded porous PLLA polymer of Example 15 taken at 45,000× magnification according to one embodiment.

A disc from Example 13 having a thickness of 2.2 mm was restrained in an apparatus capable of stretching the disc in all directions in the plane of the disc at an equal rate within a temperature controlled environment. The sample temperature was approximately 168° C. and the radial displacement rate was 1.27 mm/s. The total radial displacement was 221 mm. A microporous structure was observed using scanning electron microscopy (SEM). An SEM of the surface of an interior view of the expanded porous PLLA polymer taken at 45,000× magnification is shown in FIG. 12. The porosity of the sample was calculated to be 48.2%.

Example 16

A disc from Example 13 having a thickness of approximately 2.0 mm was restrained in an apparatus capable of stretching the disc in all directions in the plane of the disc at an equal rate within a temperature controlled environment. The platen temperature set-point was set to 180° C. and the apparatus was permitted to equilibrate. To directly ascertain material temperature, a T-type thermocouple was adhered to the top surface of the disc from Example 13 using Kapton tape. The disc was loaded into the apparatus chamber for a dwell time of 10 minutes. After dwelling, the material temperature was observed to be 168.4° C.

Example 17

Into a 2 oz square glass bottle 15.16 g (0.1052 mol) of L-lactide powder and 4.9 ul ($1.5 \times 10^{-5}$ mol) of stannous 2-ethylhexoanate was added. A foil lined screw cap was loosely placed upon the bottle, and the assembly placed in a vacuum chamber. Vacuum was drawn, then the chamber flooded with nitrogen. The bottle with cap was removed from the chamber and the cap quickly tightened. The bottle was placed in a 110° C. oven and occasionally swirled over the next few hours during the melting process. After 6 days in the oven the bottle was removed.

Analysis by proton NMR showed 99.73% of lactate ester as polymer. DSC measured peak melting temperature at 190.47° C. with a melt enthalpy of 84.34 J/g at a temperature ramp rate of 10° C./min. Inherent viscosity was 5.34 dL/g in chloroform at 25 C. at 0.1 g/dL polymer concentration.

Example 18

Into a 20 ml glass ampule 28.97 g (0.2010 mol) of L-lactide powder and 9.3 μl ($2.8 \times 10^{-5}$ mol) of stannous 2-ethylhexoanate was added. A vacuum line was fitted to the stem of the ampule, vacuum was drawn, then the ampule was flooded with nitrogen and the stem flame sealed. The ampule was placed in a 110° C. oven and occasionally shaken during the melting process. After 18 days in the oven the ampule was removed. Analysis by proton NMR showed 99.77% of lactate ester as polymer. DSC measured peak melting temperature at 189.77° C. with a melt enthalpy of 61.84 J/g at a temperature ramp rate of 10° C./min. Inherent viscosity was 5.41 dL/g in chloroform at 25° C. at 0.1 g/dL polymer concentration.

Examples 19-25

Figure 13:
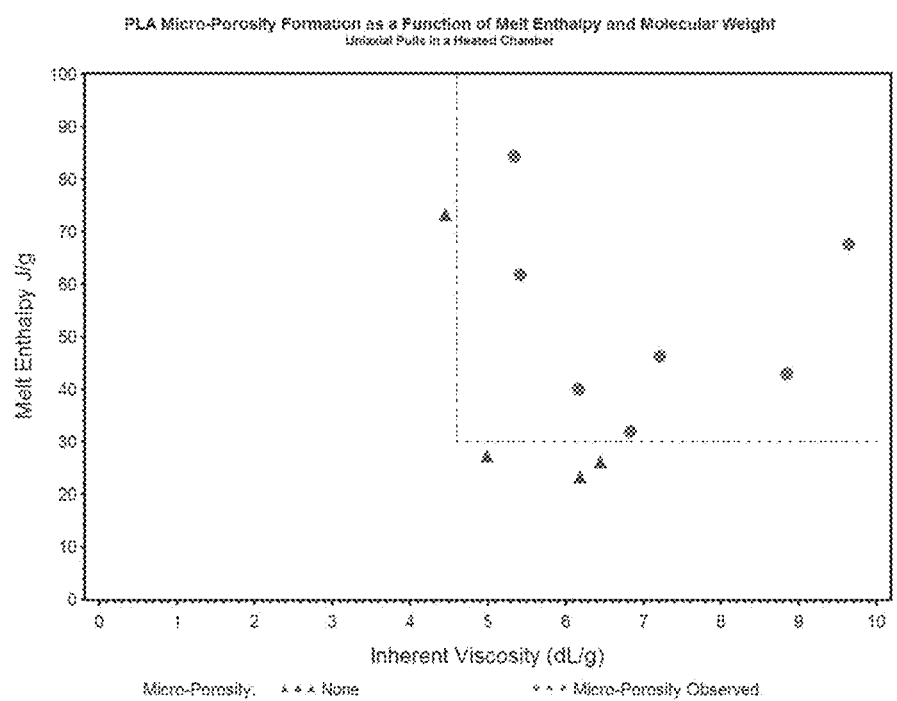
FIG. 13 is a graphical illustration of the data from Table 2 showing the formation of a microporous structure as a function of melt enthalpy and inherent viscosity according to one embodiment.

Examples 19-25 were conducted using the synthesis method and ratios of lactide, stannous 2-ethylhexoanate, and 1,5-pentanediol described in Example 12, except that 250 ml square bottles were utilized. PLA was prepared at various temperatures and various ratios of D and L isomer content. Physical properties were characterized, and samples were pulled on the MTS tensile tester and examined for evidence of microporous structure formation by scanning electron micrographs (SEMS). Results and parameters of Examples 3-9 and 19-25 are shown in Table 2. FIG. 13 is a graphical illustration of the data from Table 2 showing the formation of a microporous structure as a function of melt enthalpy and inherent viscosity.

TABLE 2

| | PLA Physical Characteristics as Synthesized | | | | | | Draw Conditions | | | |
|---|---|---|---|---|---|---|---|---|---|---|
| | | | PLA | | Visc. | | | | | |
| | Mole Fract. L Isomer | Synth. Temp. C. | PLA Melt Temp. C. | Melt Enthalpy J/g | Inherent Visc. dL/g | M.W. × $10^3$ g/mole | Gauge Length mm | Displacement rate mm/sec | Total Displacement mm | Oven Temp. C | Micro Porosity Observed |
| Ex. 3 | 1 | 110 | 188.7 | 68.19 | 9.641 | 781 | 10 | 0.1 | 40 | 170 | Yes |
| Ex. 4 | 1 | 110 | 188.7 | 68.19 | 9.641 | 781 | 10 | 1.0 | 60 | 170 | Yes |
| Ex. 5 | 1 | 110 | 188.7 | 68.19 | 9.641 | 781 | 10 | 10.0 | 60 | 170 | Yes |
| Ex. 6 | 1 | 110 | 188.7 | 68.19 | 9.641 | 781 | 10 | 100.0 | 60 | 170 | Yes |

TABLE 2-continued

| | PLA Physical Characteristics as Synthesized | | | | | | Draw Conditions | | | |
|---|---|---|---|---|---|---|---|---|---|---|
| | | | PLA | | Visc. | | | | | |
| | Mole Fract. L Isomer | Synth. Temp. C. | PLA Melt Temp. C. | Melt Enthalpy J/g | Inherent Visc. dL/g | M.W. × 10³ g/mole | Gauge Length mm | Displacement rate mm/sec | Total Displacement mm | Oven Temp. C | Micro Porosity Observed |
| Ex. 7 | 1 | 110 | 188.7 | 68.19 | 9.641 | 781 | 10 | 500.0 | 40 | 170 | Yes |
| Ex. 8 | 1 | 110 | 188.7 | 68.19 | 9.641 | 781 | 10 | 10.0 | 60 | 180 | Yes |
| Ex. 9 | 1 | 110 | 188.7 | 68.19 | 9.641 | 781 | 10 | 100.0 | 60 | 160 | Yes |
| Ex. 19 | 1 | 140 | 178.1 | 46.30 | 7.210 | 497 | 10 | 10.0 | 40 | 160 | Yes |
| | | | | | | | | | | 150 | Yes |
| Ex. 20 | 1 | 150 | 175.1 | 40.09 | 6.828 | 459 | 10 | 1.0 | 40 | 170 | Yes |
| | | | | | | | | | | 160 | Yes |
| | | | | | | | | | | 150 | Yes |
| Ex. 21 | 1 | 110 | 191.6 | 73.25 | 4.456 | 248 | 5 | 0.5 | 20 | 170 | No |
| Ex. 22 | 1 | 160 | 169.1 | 26.22 | 6.451 | 419 | 10 | 10.0 | 40 | 160 | No |
| | | | | | | | | | | 150 | No |
| | | | | | | | | | | 140 | No |
| | | | | | | | | | | 130 | No |
| | | | | | | | | | | 120 | No |
| Ex. 23 | 0.975 | 110 | 158.4 | 31.93 | 6.833 | 465 | 10 | 10.0 | 20 | 110 | Yes |
| Ex. 24 | 0.975 | 125 | 153.7 | 27.20 | 4.978 | 291 | 10 | 10.0 | 40 | 130 | No |
| | | | | | | | | | | 120 | No |
| Ex. 25 | 0.950 | 125 | 144.6 | 23.20 | 6.184 | 396 | 10 | 10.0 | 40 | 120 | No |

Example 26

The synthesis method described in Example 12 was used, except that a 250 ml square bottle was utilized. 301.54 g (2.0940 mol) of L-lactide, 6.78 µl (2.09×10⁻⁵ mol) of stannous 2-ethylhexoanate, and 2.19 µl (2.09×10⁻⁵ mol) of 1,5-pentanediol were polymerized at 110° C. for 38 days. Analysis by proton nuclear magnetic resonance (NMR) showed 42.96% of lactate ester as polymer. The bottle was removed from the oven, and the paste-like mixture of PLA/lactide was emptied from the bottle by means of a spatula. The mixture was allowed to cool and solidify, was broken into small pieces, and the lactide extracted with acetone in a Soxhlet extractor for 2 days. The recovered PLA powder was dried overnight in a vacuum chamber.

Differential Scanning Calorimetry (DSC) measured peak melting temperature at 183.65° C. with a melt enthalpy of 84.12 J/g. The inherent viscosity was determined to be 3.82 dL/g and the corresponding solution-viscosity molecular weight was calculated to be 198,000 g/mol.

Example 27

Figure 16:
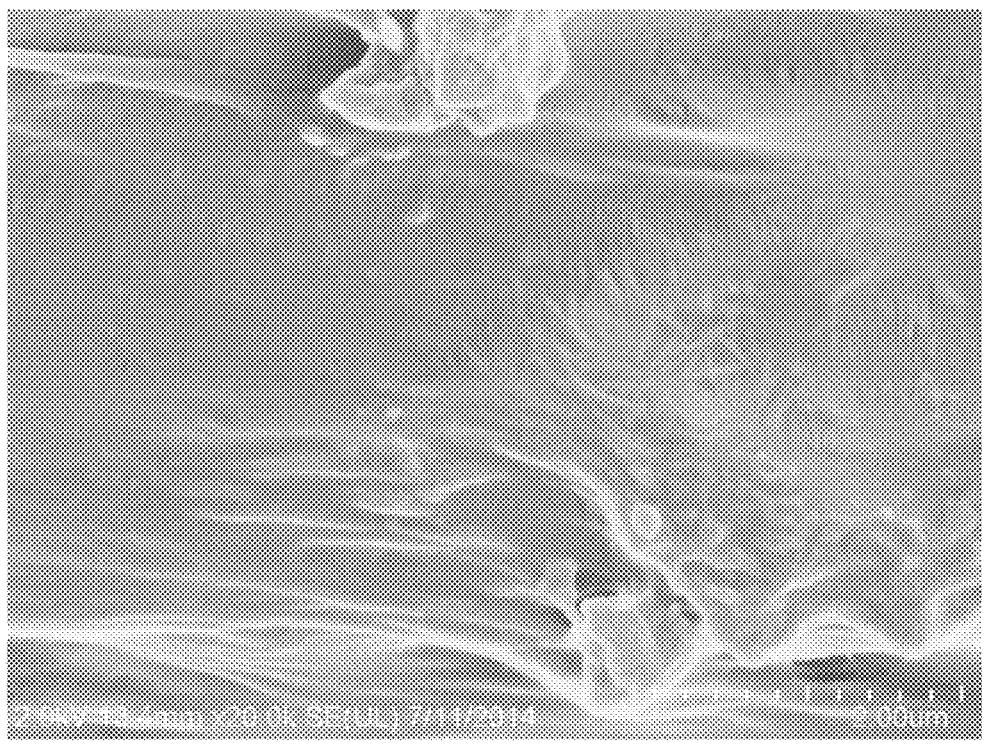
FIG. 16 is a scanning electron micrograph (SEM) of the surface of the sheet produced in Example 27 taken at 20,000× magnification in accordance with one embodiment.

The PLA powder of Example 26 was calendered at 110° C. to form a sheet. A scanning electron micrograph (SEM) of the cross-section of the sheet taken at 20,000× magnification is shown in FIG. 16. The properties of the PLA polymer sheet are set forth in Table 3.

TABLE 3

| Thickness | 0.8 mm |
|---|---|
| Matrix Tensile Strength | 35 MPa |

Example 28

The synthesis method described in Example 12 was used, except that a 250 ml square bottle was utilized. 329.58 g (2.2867 mol) of L-lactide, 3.70 µl (1.14×10⁻⁵ mol) of stannous 2-ethylhexoanate, and 1.20 µl (1.14×10⁻⁵ mol) of 1,5-pentanediol were polymerized at 110° C. for 52 days. Analysis by proton nuclear magnetic resonance (NMR) showed 40.37% of lactate ester as polymer. The bottle was removed from the oven, and the paste-like mixture of PLA/lactide was emptied from the bottle by means of a spatula. The mixture was allowed to cool and solidify, was broken into small pieces, and the lactide extracted with acetone in a Soxhlet extractor for 1 day. The recovered PLA powder was dried overnight in a vacuum chamber.

Differential Scanning Calorimetry (DSC) measured peak melting temperature at 194.55° C. with a melt enthalpy of 74.38 J/g. The inherent viscosity was 5.37 dL/g and the corresponding solution-viscosity molecular weight was calculated to be 325,000 g/mol.

Example 29

Figure 15:
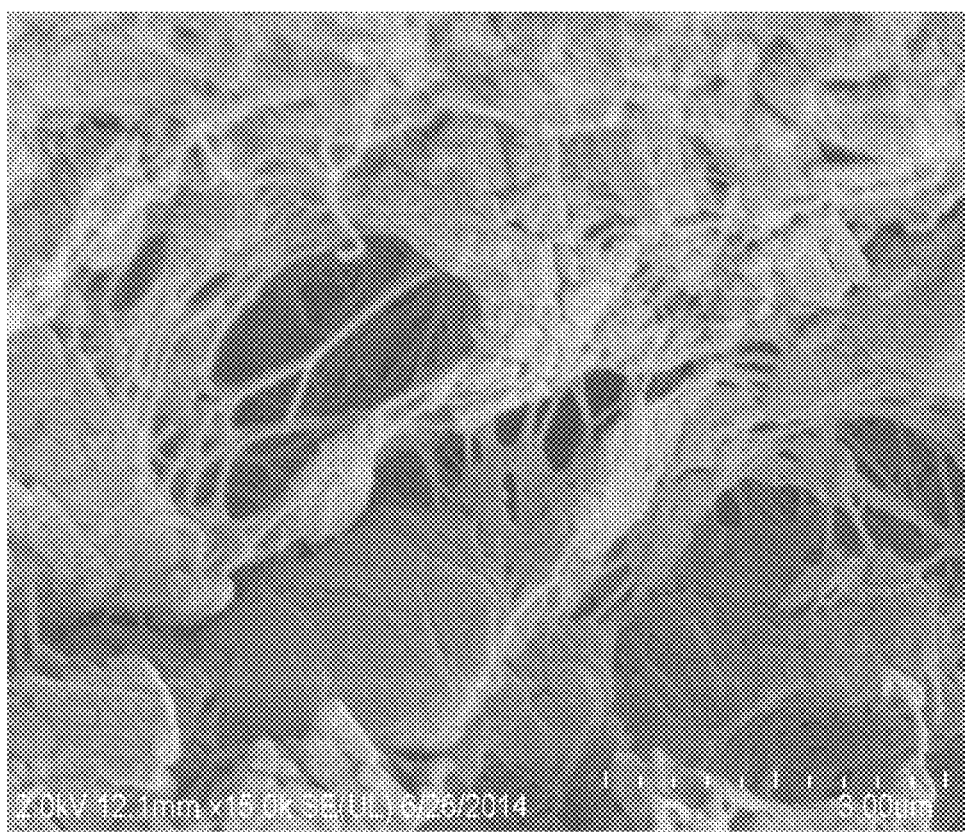
FIG. 15 is a scanning electron micrograph (SEM) of the cross-section of the tape produced in Example 29 taken at 15,000× magnification according to one embodiment.
Figure 17:
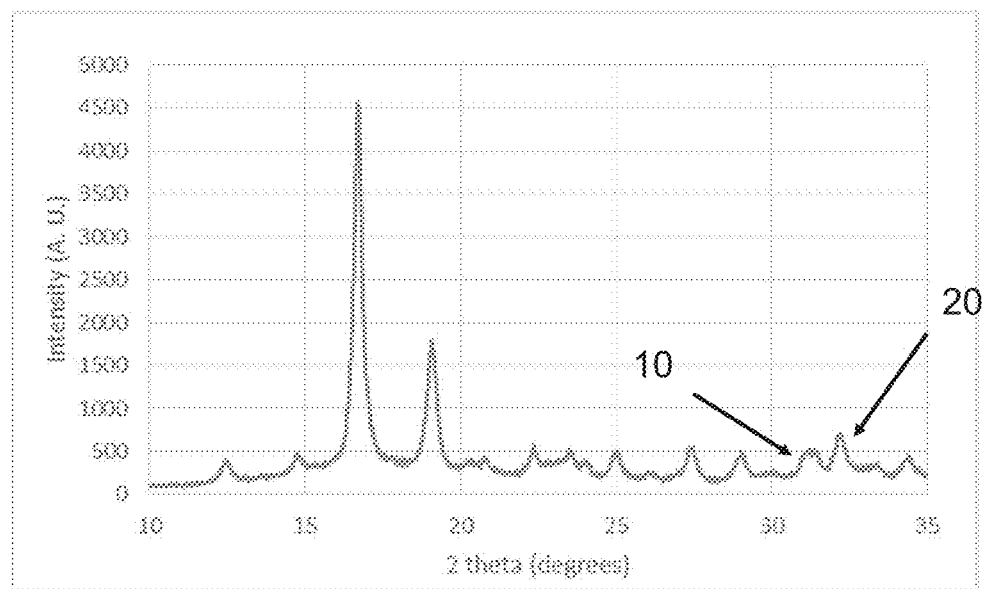
FIG. 17 is a powder X-ray diffraction (XRD) pattern plotting intensity vs. 2-theta indicating the formation of a beta crystal phase in a calendered PLA article of Example 29 in accordance with one embodiment.

The PLA powder formed in Example 28 was lubricated with mineral oil at a ratio of 40 ml/100 g of the PLA powder. The lubricated PLA powder was fed into the nip of 2 counter rotating steel rolls 304.8 mm in diameter pre-heated to 110° C. with the gap between the rolls set at 0.127 mm. The speed was 0.914 meter/min. This process yielded a continuous, cohesive opaque tape. The tape was rinsed in hexane to remove the mineral oil and allowed to air dry. Properties of the cohesive opaque tape are shown in Table 4. The porosity was measured from tape bulk density of 0.81 g/cc and a polymer density 1.23 g/cc. A scanning electron micrograph (SEM) of the cross-section of the tape taken at 15,000× magnification is shown in FIG. 15. A useful signal for the presence of beta phase crystals is the observation by a powder XRD of (023)Beta peak depicted by reference numeral 20 and (003)Beta peak depicted by reference numeral 10 as shown in FIG. 17. Properties of the cohesive opaque tape are shown in Table 4.

TABLE 4

| Thickness | 0.9 mm |
|---|---|
| Matrix Tensile Strength | 1.51 MPa |
| Porosity | 35% |

Example 30

Figure 14:
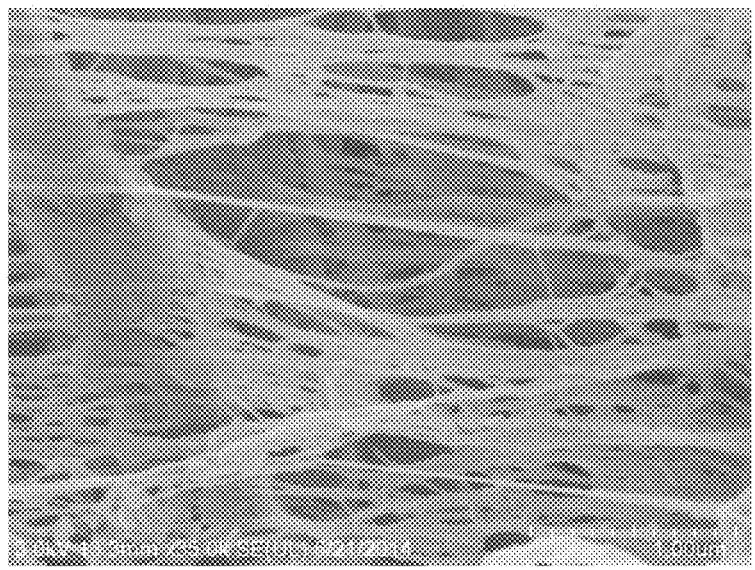
FIG. 14 is a scanning electron micrograph (SEM) of the surface of an interior view of the continuous, cohesive opaque tape of Example 30 taken at 35,000× magnification in accordance with an embodiment.

The PLLA powder formed in Example 26 was lubricated with mineral oil at a ratio of 40 ml/100 g of the PLLA powder. The lubricated PLA powder was fed into the nip of 2 counter rotating steel rolls 304.8 mm in diameter pre-heated to 110° C. with the gap between the rolls set at 0.127 mm. The speed was 0.914 meter/min. This process yielded a continuous, cohesive opaque tape. A scanning electron micrograph (SEM) of the surface of an interior view of the continuous, cohesive opaque tape taken at 35,000× magnification is shown in FIG. 14.

Example 31

An opaque section of the expanded PLA article of Example 14 was fed into the nip of 2 counter rotating steel rolls 304.8 mm in diameter pre-heated to 170° C. with the gap between the rolls set at 0.127 mm. The speed was 0.914 meter/min. The process yielded a sample that was largely translucent. The gap between the rollers was reduced to 0.05 mm, and the largely translucent sample was passed through the counter rotating steel rolls. The sample that emerged was fully translucent, indicating that the sample was densified. The matrix tensile strength of the densified PLLA material as determined by ASTM D368 type V test was determined to be 123.1 MPa. The result is an average of multiple tensile pulls from sibling samples cut from within the same densified article.

Example 32

Figure 28:
FIG. 28 is a scanning electron micrograph (SEM) of the surface of the compressed PLLA polymer of Example 32 taken at 30,000× magnification according to at least one exemplary embodiment.

A 24 mm PLA disc was die cut from the expanded porous PLLA described in Example 15. The thickness of the disc was 0.075 mm and the porosity was calculated to be 50.6%. The disc was placed between 2 sheets of 0.125 mm thick polyimide film and compressed between the 152 mm×152 mm platens of a heated press (Model No. 3312, Carver, Inc. Wabash, Ind.). The disc was placed in the press at 120° C. and 89 KN. The heat was immediately turned off and the PLLA disc was held under pressure as the press was allowed to cool to 48° C. over a time period of 73 minutes. A 7 mm disc was cut from the compressed PLLA disc and the thickness and mass were measured. The porosity was calculated to be 6.6%. A scanning electron micrograph (SEM) of the surface of the compressed PLLA polymer taken at 30,000× magnification is shown in FIG. 28. Evidence of the fibrillated structure is visible in the image.

Example 33

The material of Example 1 was cut on a bandsaw into a slice approximately 1 mm thick, approximately 50 mm width, approximately 50 mm length. The slice was drawn uniaxially in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.) equipped with a convection oven set to 170° C. The sample had a gauge length of 20 mm and was drawn uniaxially with a crosshead displacement rate of 200 mm/s. The total displacement was 40 mm. The sample was removed from the grips, rotated 90 degrees, trimmed to a width of 50 mm, and reloaded into the grips such that the second draw was perpendicular to the first draw. The sample had a gauge length of 20 mm and was drawn uniaxially a second time with a crosshead displacement rate of 20 mm/s. The total displacement was 20 mm. The porosity was calculated to be 46.7%. The Gurley flow was determined to be 0.468 seconds.

Example 34

Figure 18:
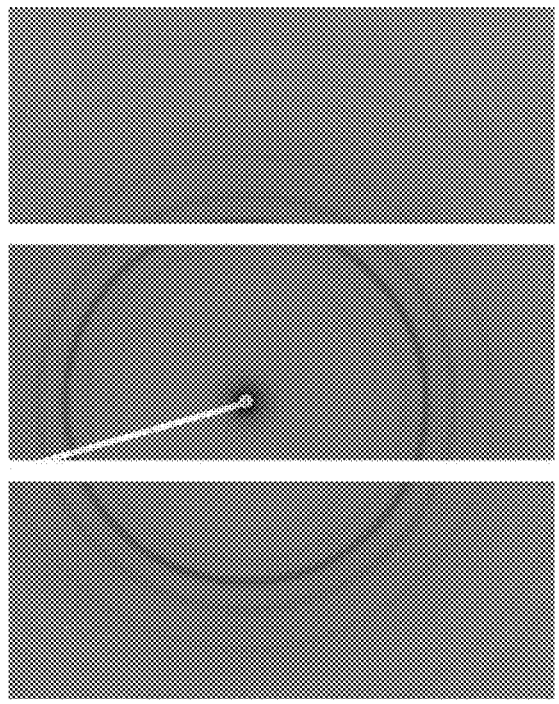
FIG. 18 is a wide angle X-ray diffraction (WAXD) pattern of the PLLA powder of Example 34 in accordance with at least one embodiment.
Figure 19:
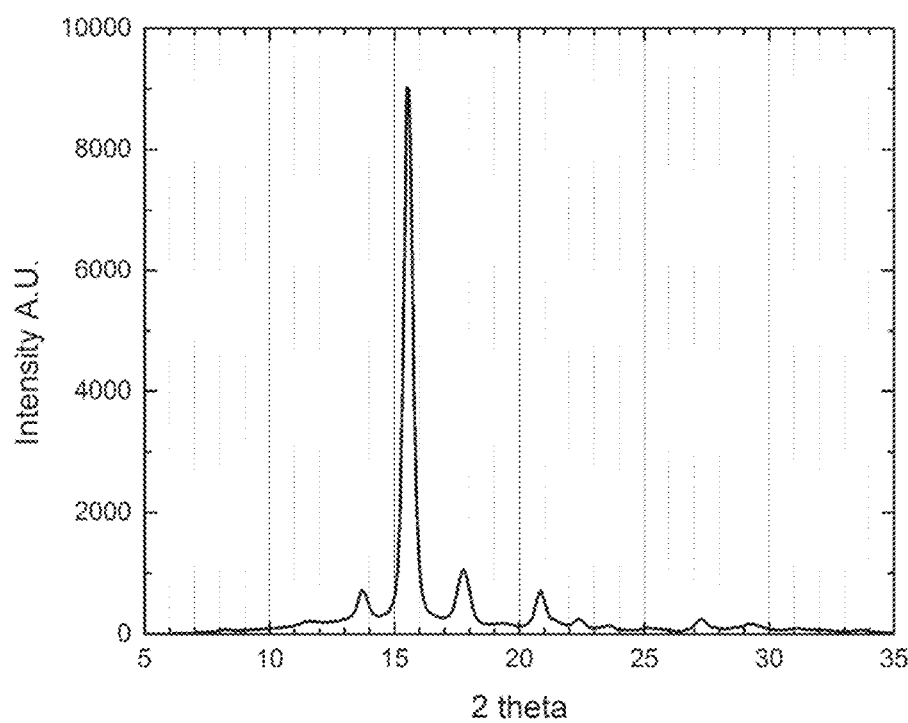
FIG. 19 is an intensity vs. 2-theta plot of the wide angle X-ray diffraction (WAXD) patterns of FIG. 18 according to at least one embodiment.

Approximately 2 grams of PLLA from Example 12 was weighed into each of four 2-liter glass bottles, the total PLLA charge weight among the 4 bottles being 8.39 g. The bottles were filled to the 1.8 L mark with anhydrous o-xylene, the headspace purged with nitrogen from a hose, and a PTFE-lined PBT cap quickly screwed into place. The four bottles were placed in a 140° C. oven, and occasionally swirled by hand. After approximately 2.5 hours, the PLLA was solvated into the o-xylene, and the oven temperature reduced to 70° C. for overnight. The bottles were removed from the oven the next morning, and allowed to cool and stand at room temperature for another day. The PLLA precipitate was filtered from the o-xylene, placed into a 250 ml bottle, and the bottle filled with hexanes. The bottle was shaken, centrifuged, and decanted, with this washing process being repeated an additional 2 times. The PLLA precipitate was transferred to a 500 ml wide-mouth glass jar by means of a spatula, and the remaining PLLA precipitate on the sides of the 250 ml bottle was washed into the 500 ml jar using several 10 ml portions of hexanes. A small amount of additional hexanes were added as needed to form a slurry by stirring with the spatula. 1.55 g of a light-grade mineral oil lubricant was added to the PLLA/hexanes slurry, and slurry was then stirred for several minutes. The hexanes were evaporated by impinging an air stream into the 500 ml jar while continuously stirring with the spatula. The slurry turned into crumbs, and the crumbs into a fine free-flowing powder as the hexanes evaporated. The jar was placed in a vacuum chamber for several hours to remove the remaining hexanes. The jar was removed from the vacuum chamber and weighed, and had a net weight of 7.96 g. The mixture content of the resulting powder was calculated to be 80.5% PLLA, 19.5% mineral oil by weight. A wide angle x-ray diffraction (WAXD) pattern of the PLLA powder is shown in FIG. 18. FIG. 19 is an intensity vs. 2-theta plot of the wide angle X-ray diffraction (WAXD) patterns of FIG. 18, which shows the absence of beta crystals. The inherent viscosity was determined to be 5.83 dL/g.

Example 35

Figure 20:
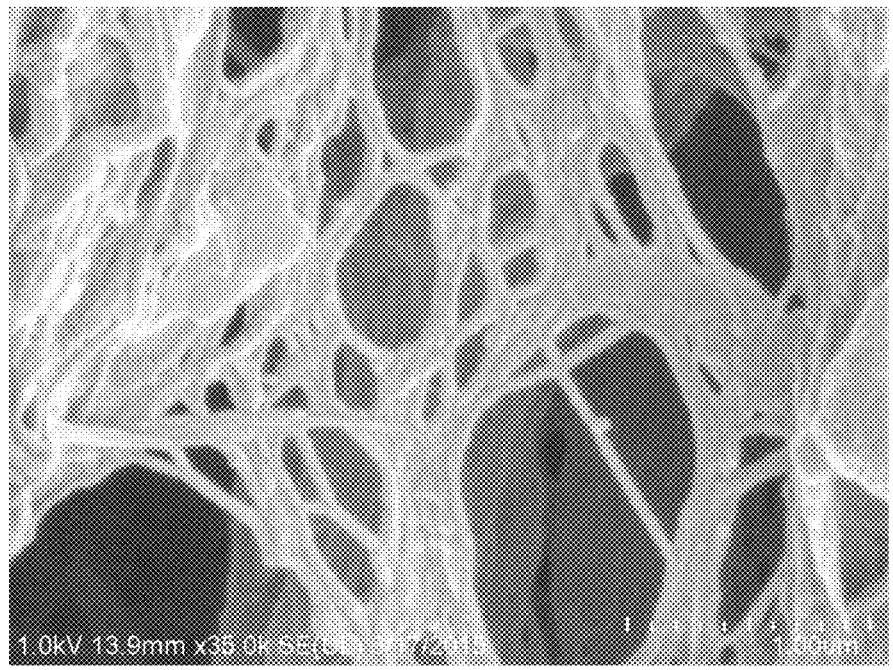
FIG. 20 is a scanning electron micrograph (SEM) of the surface of the PLLA film of Example 35 taken at 35,000× magnification in accordance with an embodiment.

A portion of the PLLA/mineral-oil powder of Example 34 was poured into the nip of 2 counter rotating steel rolls 203.2 mm in diameter, having a roll speed of 0.914 meter/minute, a surface temperature of 125° C., and gapped at 0.025 mm. The resulting film was approximately 0.4 mm thickness. The film was immersed approximately 10 minutes in a hexanes bath to remove the mineral oil lubricant. This wash was repeated an additional 2 times, with fresh hexanes being used each time. The porosity of the film was calculated to be 26.4%. A scanning electron micrograph (SEM) of the surface of an interior view of the calendered PLLA film taken at 35,000× magnification is shown in FIG. 20. The inherent viscosity was determined to be 6.04 d L/g.

Example 36

Figure 21:
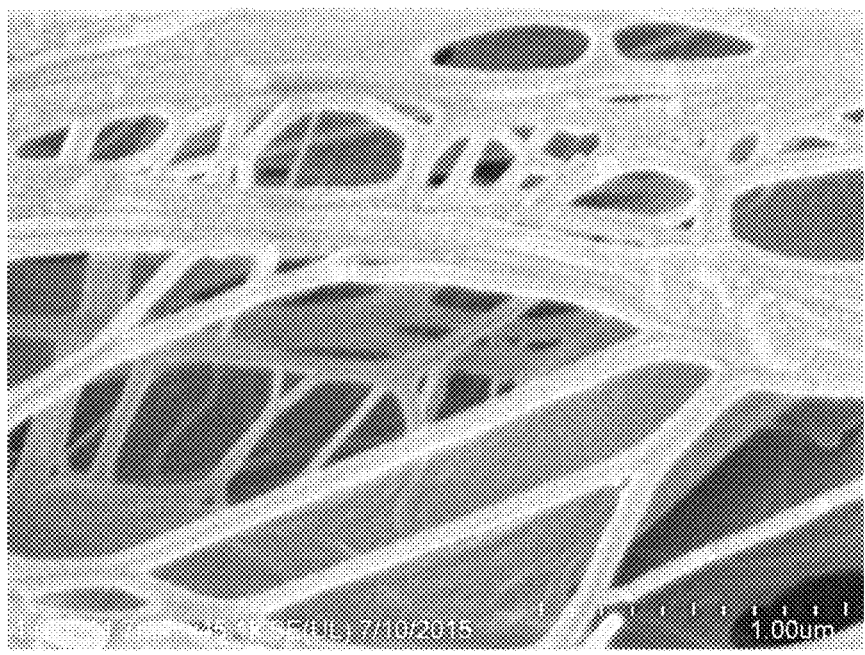
FIG. 21 is a scanning electron micrograph (SEM) of the surface of the PLLA film of Example 36 taken at 45,000× magnification in accordance with an embodiment.
Figure 22:
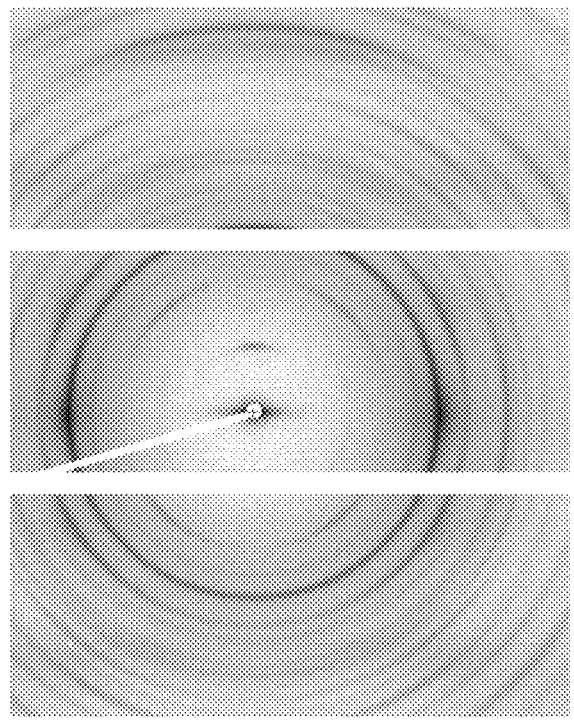
FIG. 22 is a wide angle x-ray diffraction (WAXD) pattern of the PLLA film of Example 36 according to one embodiment.
Figure 23:
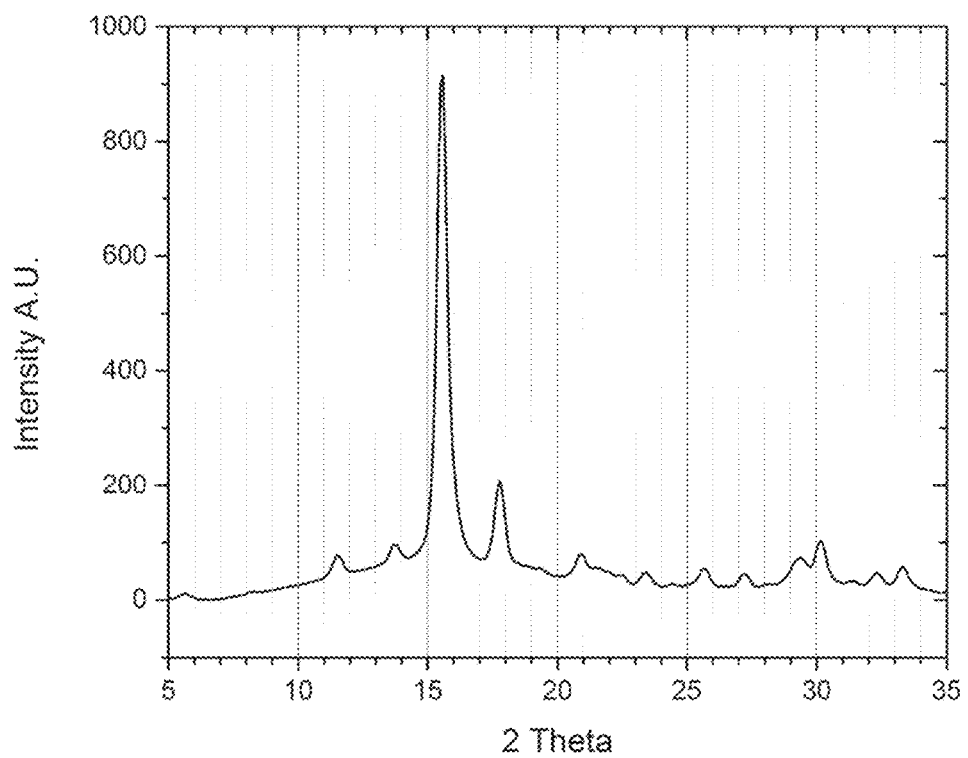
FIG. 23 is an intensity vs. 2-theta plot of the wide angle X-ray diffraction (WAXD) patterns of FIG. 22 in accordance with an embodiment.

A portion of the calendered PLLA film from Example 35 was cut into a strip measuring 10.2 mm width, 0.390 mm thickness, and approximately 50 mm in length. The strip was drawn in an Instron machine (Model No. 5965 commercially available from Illinois Tool Works Inc., Norwood, Mass.), equipped with a convection oven set to 160° C. The sample gauge length was set to 10 mm. After equilibrating 10 minutes in the oven, the sample was then drawn uniaxially with a crosshead displacement rate of 1 mm/s and a total displacement of 100 mm. A microporous structure was observed using scanning electron microscopy (SEM). The porosity was calculated to be 49.34%. A scanning electron micrograph (SEM) of the surface of an interior view of the expanded PLLA film taken at 45,000× magnification is shown in FIG. 21. A wide angle x-ray diffraction (WAXD) pattern of the expanded PLLA film is shown in FIG. 22. FIG. 23 is an intensity vs. 2-theta plot of the wide angle X-ray diffraction (WAXD) patterns of FIG. 22, which shows the presence of beta crystals. The inherent viscosity was determined to be 5.98 dL/g.

Example 37

Figure 24:
FIG. 24 is a scanning electron micrograph (SEM) of the surface of the PLLA film of Example 37 taken at 25,000× magnification in accordance with an embodiment.

A portion of the calendered PLLA film from Example 35 was cut into in strip measuring 37.8 mm width, 0.434 mm thickness, and approximately 50 mm in length. The strip was drawn in an Instron machine (Model No. 5965 commercially available from Illinois Tool Works Inc., Norwood, Mass.), equipped with a convection oven set to 160° C. The sample gauge length was set to 10 mm. After equilibrating 10 minutes in the oven, the sample was then drawn uniaxially with a crosshead displacement rate of 1 mm/s and a total displacement of 60 mm. The sample was removed from the grips, and the thickness measured to be 0.156 mm. The sample was trimmed to a length of 20.1 mm along the axis of draw, rotated 90 degrees and reloaded into the grips such that 20.1 mm was the new width. After equilibrating 10 minutes in the oven, the sample was then drawn uniaxially a second time, this instance being perpendicular to the first draw, with a crosshead displacement rate of 1 mm/s and a total displacement of 40 mm. A microporous structure was observed using scanning electron microscopy (SEM). The porosity was calculated to be 47.31%. A scanning electron micrograph (SEM) of the surface of an interior view of the PLLA film taken at 25,000× magnification is shown in FIG. 24. The inherent viscosity was determined to be 6.33 dL/g.

Example 38

A portion of the PLLA/mineral-oil powder of Example 34 was washed 3 times with hexanes to remove the mineral oil. The mineral-oil free PLLA powder was poured into the nip of 2 counter rotating steel rolls 203.2 mm in diameter, having a roll speed of 0.914 meter/minute, a surface temperature of 125° C., and gapped at 0.025 mm. The resulting film was approximately 0.7 mm in thickness. The porosity of the film was calculated to be 5.66%.

Example 39

Figure 25:
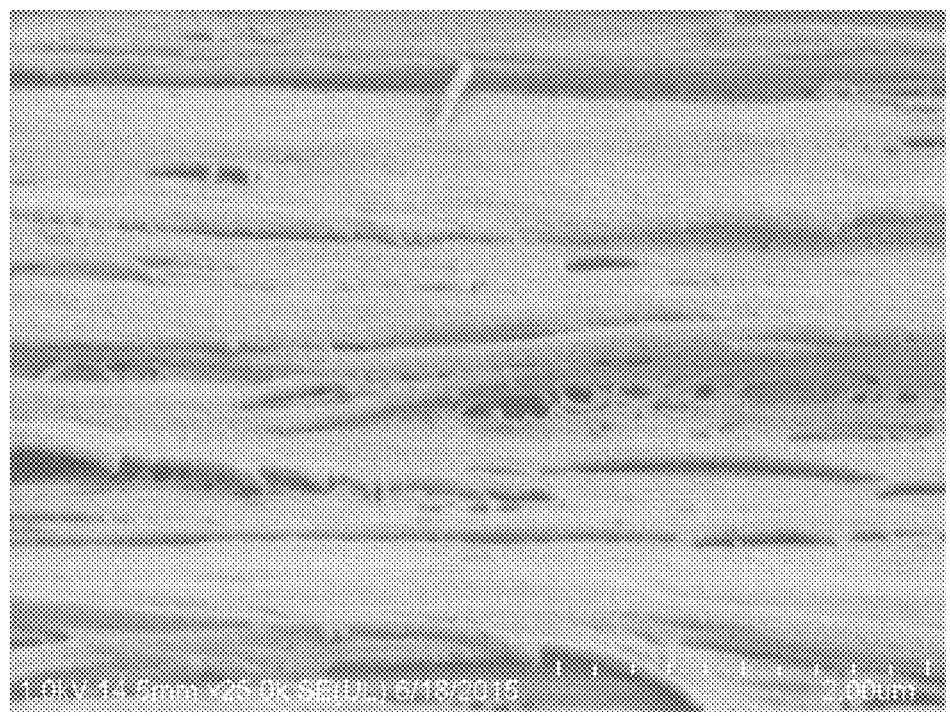
FIG. 25 is a scanning electron micrograph (SEM) of the surface of the PLLA film of Example 39 taken at 25,000× magnification in accordance with an embodiment.
Figure 26:
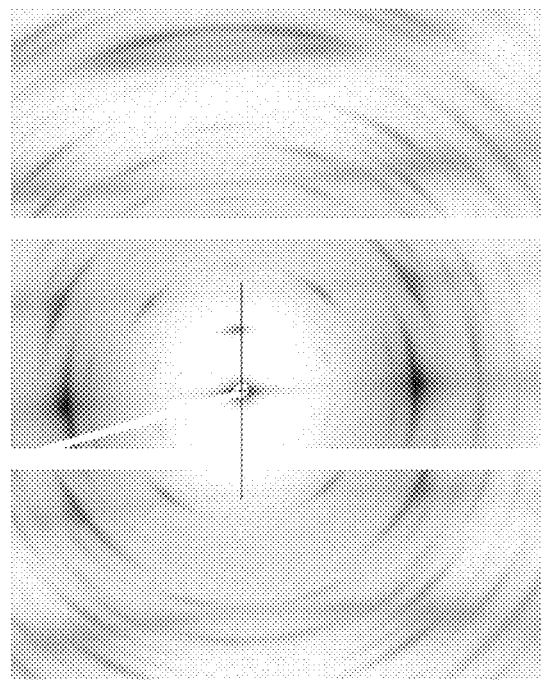
FIG. 26 is a wide angle x-ray diffraction (WAXD) pattern of the PLLA film of Example 39 in accordance with one exemplary embodiment.
Figure 27:
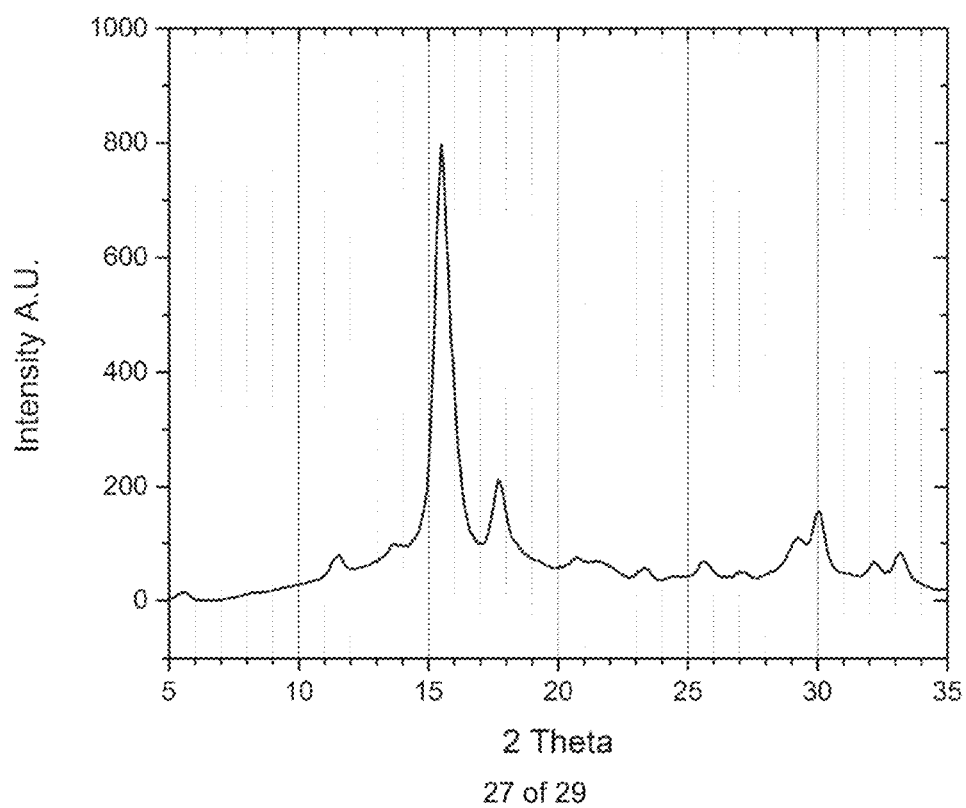
FIG. 27 is an intensity vs. 2-theta plot of the wide angle X-ray diffraction (WAXD) pattern of FIG. 26 according to at least one embodiment.

The calendered PLLA film from Example 38 was cut into in strip measuring 10.8 mm width, 0.711 mm thickness, and approximately 50 mm in length. The strip was drawn in an Instron machine (Model No. 5965 commercially available from Illinois Tool Works Inc., Norwood, Mass.), equipped with a convection oven set to 160° C. The sample had a gauge length of 10 mm, and was drawn uniaxially with a crosshead displacement rate of 1 mm/s. The total displacement was 100 mm. A fibrillated structure. was observed using scanning electron microscopy (SEM). The porosity was calculated to be 6.98%. A scanning electron micrograph (SEM) of the surface of an interior view the dense PLLA film taken at 25,000× magnification is shown in FIG. 25. A wide angle x-ray diffraction (WAXD) pattern of the PLLA film is shown in FIG. 26. FIG. 27 is an intensity vs. 2-theta plot of the wide angle X-ray diffraction (WAXD) patterns of FIG. 26, which shows the presence of beta crystals.

Example 40

A powder consisting of PLLA and light-grade mineral oil lubricant was prepared according to the method of Example 34, with a yield of 8.02 g. The mixture content of the resulting powder was calculated to be 80.4% PLLA and 19.6% mineral oil by weight.

Example 41

2.67 g of Syloid 620 silica powder (W. R. Grace & Co., Connecticut) was added to the PLLA/mineral oil powder of Example 40. This new mixture was thoroughly mixed by tumbling the jar container for several hours. The mixture content of the resulting powder was calculated to be 60.3% PLLA, 14.7% mineral oil and 25.0% silica by weight.

Example 42

Figure 29:
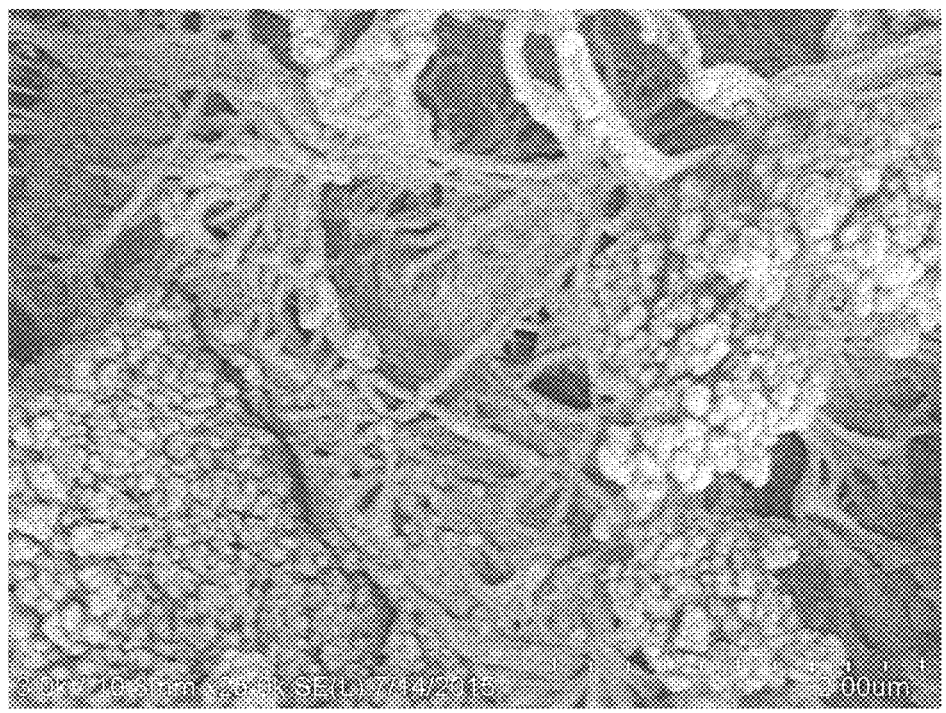
FIG. 29 is a scanning electron micrograph (SEM) of the PLLA/silica film of Example 42 taken at 25,000× according to an exemplary embodiment.

A portion of the PLLA/mineral-oil/silica powder of Example 41 was poured into the nip of 2 counter rotating steel rolls 203.2 mm in diameter, having a roll speed of 0.914 meter/minute, a surface temperature of 125° C., and gapped at 0.025 mm. The first pass through the nip resulted in the formation of large flakes. The flakes were collected and the material passed through the nip a second time, which resulted in the formation of a coherent film. The film was rotated 90 degrees and passed through the nip a third time, the orientation passing through the nip being perpendicular to the second pass. The film was rotated 90 degrees and passed through the nip a fourth time, the orientation passing through the nip being parallel to the second pass. The film was immersed approximately 10 minutes in a hexanes bath to remove the mineral oil lubricant. This wash was repeated an additional 2 times, with fresh hexanes being used each time. After air drying, the film was placed in a vacuum chamber to remove the remaining hexanes. The filled film resulting from this process had a typical thickness of 0.75 mm, good physical integrity, and could be handled without cracking or visible particle shedding. The bulk density was calculated to be 0.767 g/ml. Using 1.23 g/ml as the basis density for PLLA, and 2.20 g/ml as the basis density for silica, the average density of the PLLA/silica solids was calculated to be 1.42 g/ml. The porosity of the PLLA/silica film was calculated to be 46.0%. The matrix tensile strength of the PLLA/silica film was determined to be 15.8 MPa. A scanning electron micrograph (SEM) of the PLLA/silica film taken at 25,000× is shown in FIG. 29.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A process for forming a porous article comprising: expanding a PLA polymer at a temperature above the glass transition temperature of said PLA polymer and below a melting temperature of said PLA polymer to create a porous expanded PLA polymer article comprising a detectable beta crystal phase and nodes and fibrils.

2. The process of claim 1, wherein said expanding occurs at a temperature from at least about 1° above the glass transition temperature of said PLA polymer to at least about 1° C. below the melt temperature of said PLA polymer.

3. The process of claim 1, wherein said expanding occurs at a temperature from about 60° C. to about 185° C. to form said porous PLA article.

4. The process of claim 1, further comprising compressing said porous PLA polymer article at a temperature below said melting temperature of said PLA polymer to form a dense PLA article having a porosity less than about 10%.

5. The process of claim 1, further comprising adding at least one member selected from the group consisting of a filler material and a coating material to said porous PLA article.

6. The process of claim 1, further comprising removing residual monomer prior to said expanding below said melt temperature of said PLA polymer.

7. The process of claim 1, wherein said fibrils comprise polymer chains and said polymer chains are oriented along a fibril axis.

8. The process of claim 1, wherein said expanded PLA polymer article is in the form of films, rods, tubes, or discs.

9. The process of claim 1, wherein said porous PLA polymer article has a matrix tensile strength greater than or equal to 110 MPa.

10. The process of claim 1, wherein said porous PLA polymer article has a modulus greater than or equal to 3000 MPa.

11. The process of claim 1, wherein said porous PLA polymer article has a porosity greater than about 25%.

12. The process of claim 1, wherein said PLA polymer has an inherent viscosity greater than about 5 dL/g.

13. The process of claim 12, wherein said PLA polymer has a molecular weight greater than about 290,000 g/mol.

14. The process of claim 1, wherein said PLA polymer article has a melt enthalpy greater than about 30 J/g.

15. The process of claim 1, wherein said PLA polymer comprises at least one comonomer.

16. The process of claim 1, wherein said PLA polymer comprises poly L-lactic acid (PLLA), poly d-lactic acid (PDLA), poly L-lactide, poly D-lactide, and combinations thereof.

17. A process for forming a microporous article comprising:
lubricating a PLA polymer powder to form a lubricated PLA polymer;
subjecting said lubricated PLA polymer to pressure and to a temperature above the glass transition temperature of said PLA polymer and below a melting temperature of said PLA polymer to form a preform; and
expanding said preform at a temperature below the melt temperature of said PLA polymer to form a porous PLA article having a structure of nodes and fibrils.

18. The process of claim 17, wherein said subjecting comprises calendering said preform article below said melt temperature.

19. The process of claim 17, wherein said calendering occurs at a temperature that is about 80° C. or less below said melt temperature.

20. The process of claim 17, wherein said subjecting step comprises ram extruding said lubricated PLA polymer at a temperature that is below said melt temperature of said PLA polymer.

21. The process of claim 20, wherein said ram extruding occurs at a temperature that is about 80° C. or less below said melt temperature.

22. The process of claim 17, further comprising removing said lubricant from said preform prior to said expanding.

23. The process of claim 17, further comprising compressing said porous PLA article to form a dense article having a porosity of less than about 10%.

24. The process of claim 17, further comprising adding at least one member selected from the group consisting of a filler material and a coating material to said microporous article.

25. The process of claim 17, wherein said PLA polymer comprises poly L-lactic acid (PLLA), poly d-lactic acid (PDLA), poly L-lactide, poly D-lactide, and combinations thereof.

26. The process of claim 17, wherein said PLA polymer comprises at least one comonomer.

27. The process of claim 17, wherein said porous PLA article has a matrix tensile strength greater than or equal to 110 MPa.

28. The process of claim 17, wherein said porous PLA article has a matrix modulus greater than or equal to 3000 MPa.

29. The process of claim 17, wherein said porous PLA article has a porosity greater than about 25%.

30. The process of claim 17, wherein said PLA polymer has an inherent viscosity greater than about 3.8 dL/g.

31. The process of claim 30, wherein said PLA polymer has a molecular weight greater than about 190,000 g/mol.

32. The process of claim 17, wherein said PLA polymer has a melt enthalpy greater than about 30 J/g.

33. The process of claim 17, wherein said fibrils comprise polymer chains and said polymer chains are oriented along a fibril axis.

34. The process of claim 1, wherein said nodes comprise a volume of said expanded PLA polymer, and
wherein said fibrils originate and terminate from said nodes.

* * * * *